(12) United States Patent
Welbourne et al.

(10) Patent No.: US 10,178,301 B1
(45) Date of Patent: Jan. 8, 2019

(54) USER IDENTIFICATION BASED ON VOICE AND FACE

(71) Applicant: Amazon Technologies, Inc., Seattle, WA (US)

(72) Inventors: William Evan Welbourne, Seattle, WA (US); Ross David Roessler, Seattle, WA (US); Cheng-Hao Kuo, Seattle, WA (US); Jim Oommen Thomas, Seattle, WA (US); Paul Aksenti Savastinuk, Shoreline, WA (US); Yinfei Yang, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 176 days.

(21) Appl. No.: 14/750,895

(22) Filed: Jun. 25, 2015

(51) Int. Cl.
*G10L 17/00* (2013.01)
*H04N 5/232* (2006.01)
*H04N 5/222* (2006.01)

(52) U.S. Cl.
CPC ......... *H04N 5/23219* (2013.01); *G10L 17/00* (2013.01); *H04N 5/2228* (2013.01)

(58) Field of Classification Search
USPC ................................ 704/246, 247, 251, 252
See application file for complete search history.

(56) References Cited

U.S. PATENT DOCUMENTS

| | | | | |
|---|---|---|---|---|
| 8,154,578 B2* | 4/2012 | Kurtz | ................. | G06K 9/00335 348/14.01 |
| 8,941,741 B1* | 1/2015 | McDonough | ...... | G06K 9/00288 348/161 |
| 9,002,707 B2* | 4/2015 | Yamada | ............. | G06K 9/00335 704/231 |
| 9,225,701 B2* | 12/2015 | Gongaware | ............. | H04L 63/08 |
| 9,298,974 B1* | 3/2016 | Kuo | .................... | H04N 13/0239 |
| 9,569,656 B2* | 2/2017 | Khandpur | .......... | G06K 9/00221 |
| 9,729,865 B1* | 8/2017 | Kuo | .................... | G06K 9/00268 |
| 2006/0039586 A1* | 2/2006 | Takematsu | ........ | G06F 17/30038 382/115 |
| 2011/0224978 A1* | 9/2011 | Sawada | ............. | G06K 9/00221 704/231 |
| 2013/0124209 A1* | 5/2013 | Yamada | ............. | G06K 9/00335 704/275 |
| 2013/0263227 A1* | 10/2013 | Gongaware | ............. | H04L 63/08 726/4 |

(Continued)

*Primary Examiner* — Leonard Saint Cyr
(74) *Attorney, Agent, or Firm* — Pierce Atwood LLP

(57) ABSTRACT

Devices, systems and methods are disclosed for improving facial recognition and/or speaker recognition models by using results obtained from one model to assist in generating results from the other model. For example, a device may perform facial recognition for image data to identify users and may use the results of the facial recognition to assist in speaker recognition for corresponding audio data. Alternatively or additionally, the device may perform speaker recognition for audio data to identify users and may use the results of the speaker recognition to assist in facial recognition for corresponding image data. As a result, the device may identify users in video data that are not included in the facial recognition model and may identify users in audio data that are not included in the speaker recognition model. The facial recognition and/or speaker recognition models may be updated during run-time and/or offline using post-processed data.

20 Claims, 23 Drawing Sheets

(56) References Cited

U.S. PATENT DOCUMENTS

| | | | |
|---|---|---|---|
| 2014/0366111 A1* | 12/2014 | Sheller | H04L 63/08 726/7 |
| 2015/0094097 A1* | 4/2015 | Fraccaroli | H04W 4/021 455/456.3 |
| 2015/0163448 A1* | 6/2015 | Khandpur | G06K 9/00221 348/77 |
| 2015/0262024 A1* | 9/2015 | Braithwaite | G06K 9/00255 382/118 |

* cited by examiner

FIG. 3
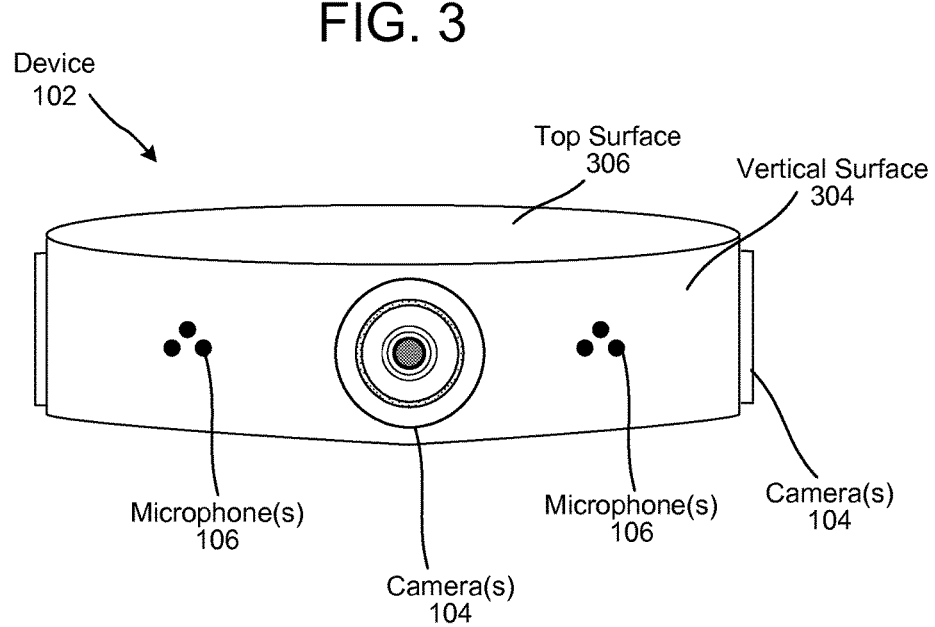
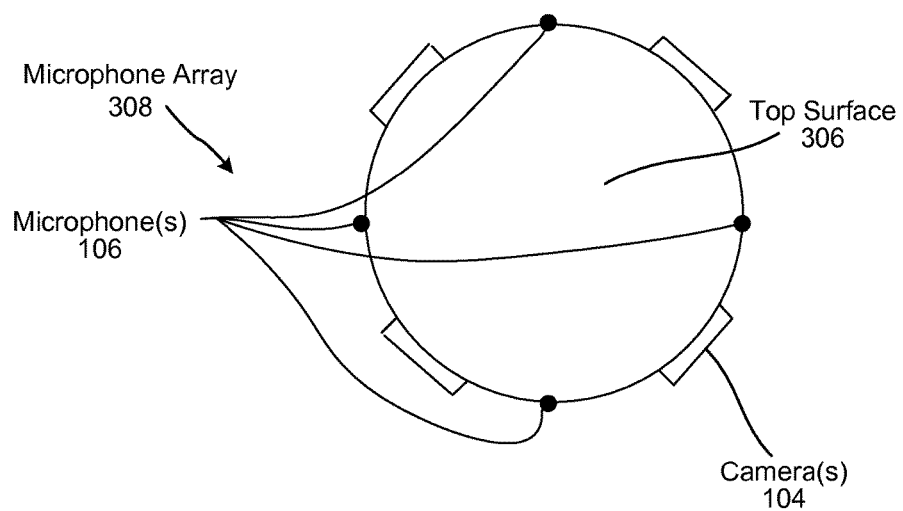

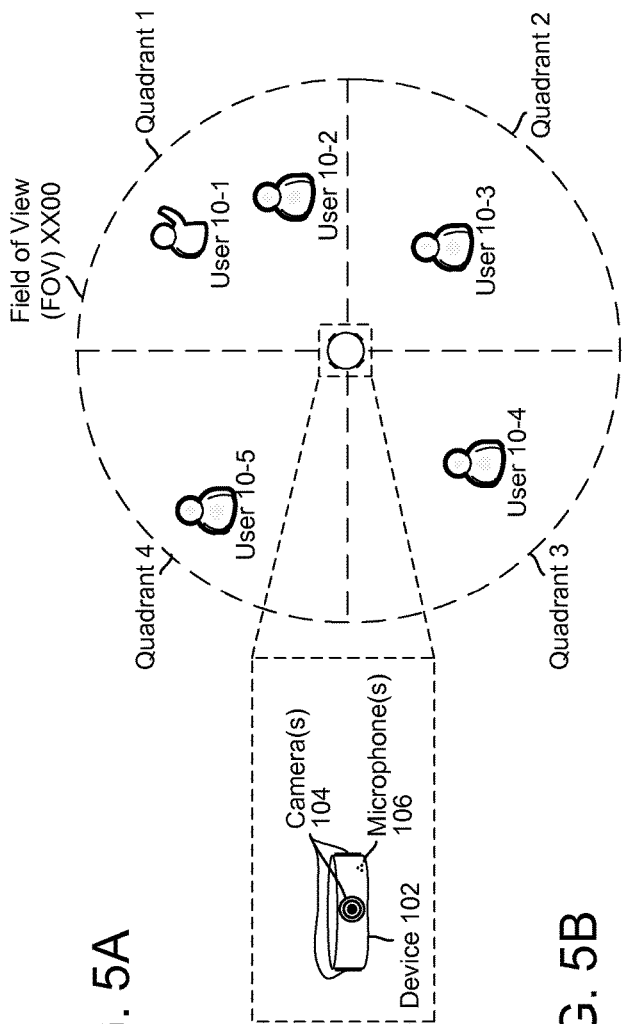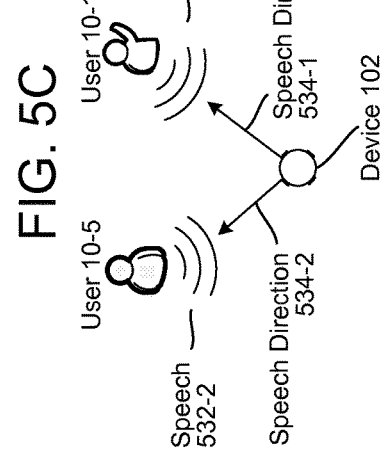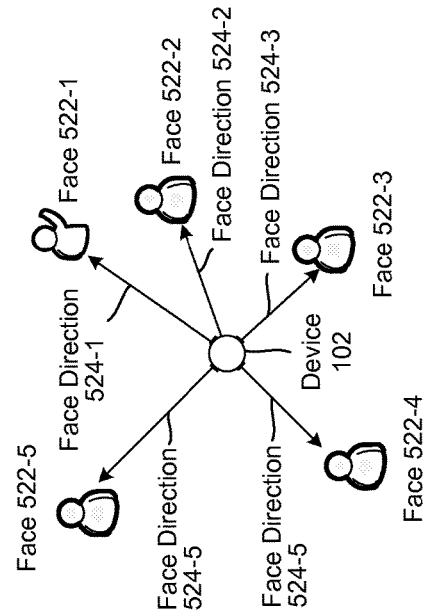
FIG. 5A
FIG. 5B
FIG. 5C

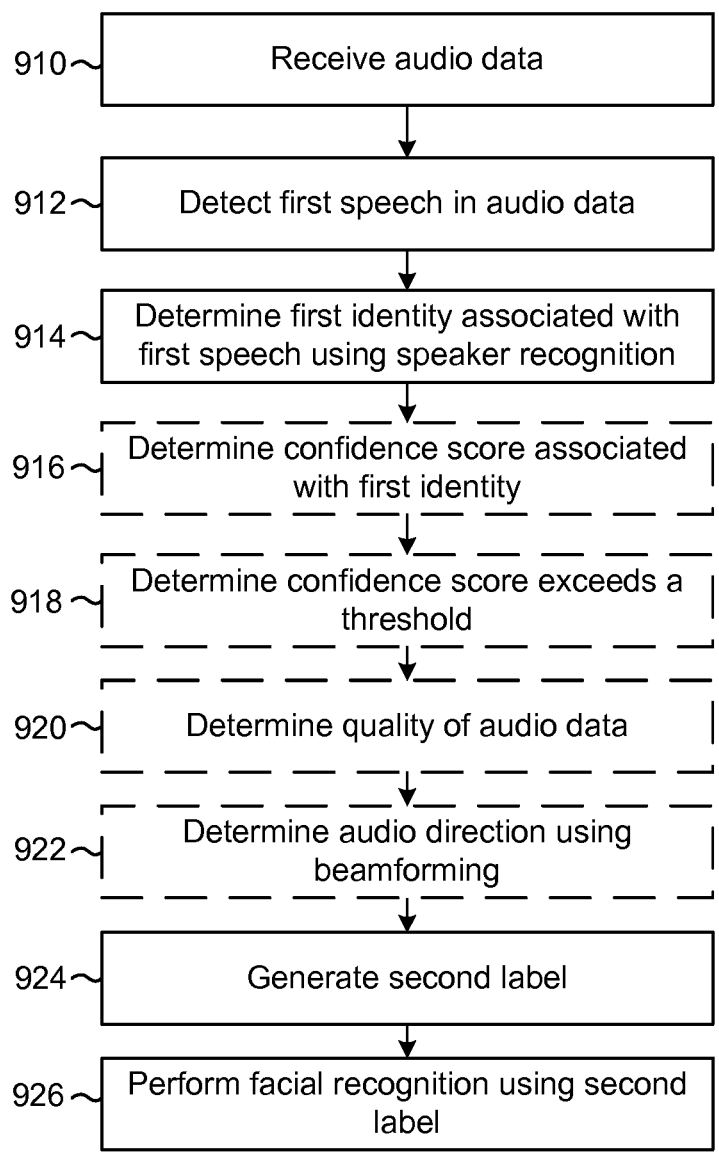

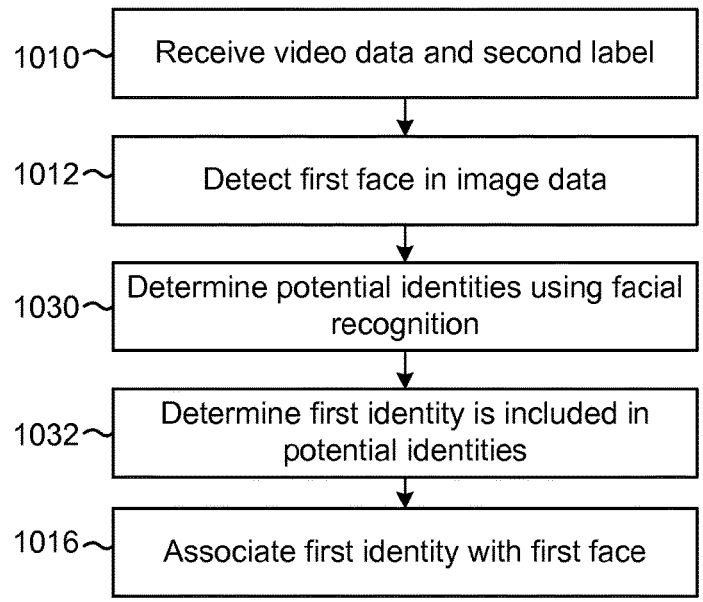
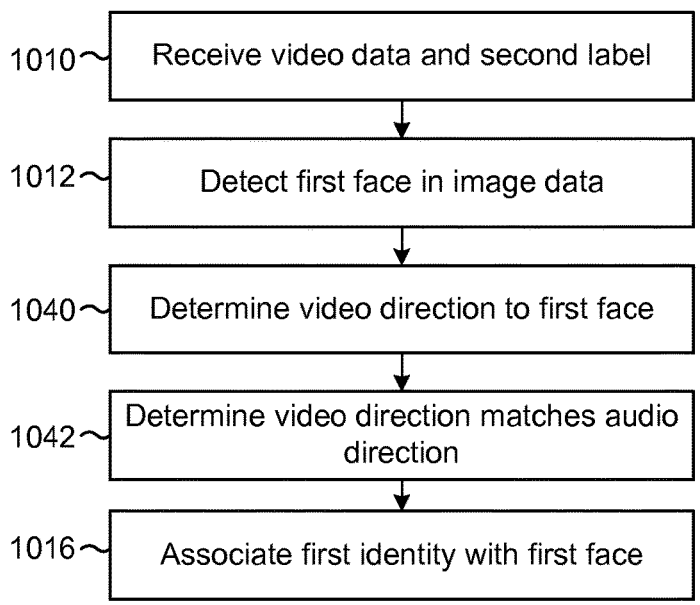

USER IDENTIFICATION BASED ON VOICE AND FACE

BACKGROUND

With the advancement of technology, the use and popularity of electronic devices has increased considerably. Electronic devices are commonly used to capture video data using one or more cameras and audio data using one or more microphones. Facial recognition may be used to identify individual users from image data and speaker recognition may be used to identify individual users from corresponding audio data.

BRIEF DESCRIPTION OF DRAWINGS

For a more complete understanding of the present disclosure, reference is now made to the following description taken in conjunction with the accompanying drawings.

FIG. 3 is an illustration of an audio component that may be used according to embodiments of the present disclosure.

FIGS. 5A-5C illustrate examples of determining directions of faces and speech according to embodiments of the present disclosure.

FIG. 9 is a flowchart conceptually illustrating an example method for generating an identification label according to embodiments of the present disclosure.

FIGS. 10A-10D are flowcharts conceptually illustrating example methods for using speaker recognition to assist facial recognition according to embodiments of the present disclosure.

DETAILED DESCRIPTION

Figure 1:
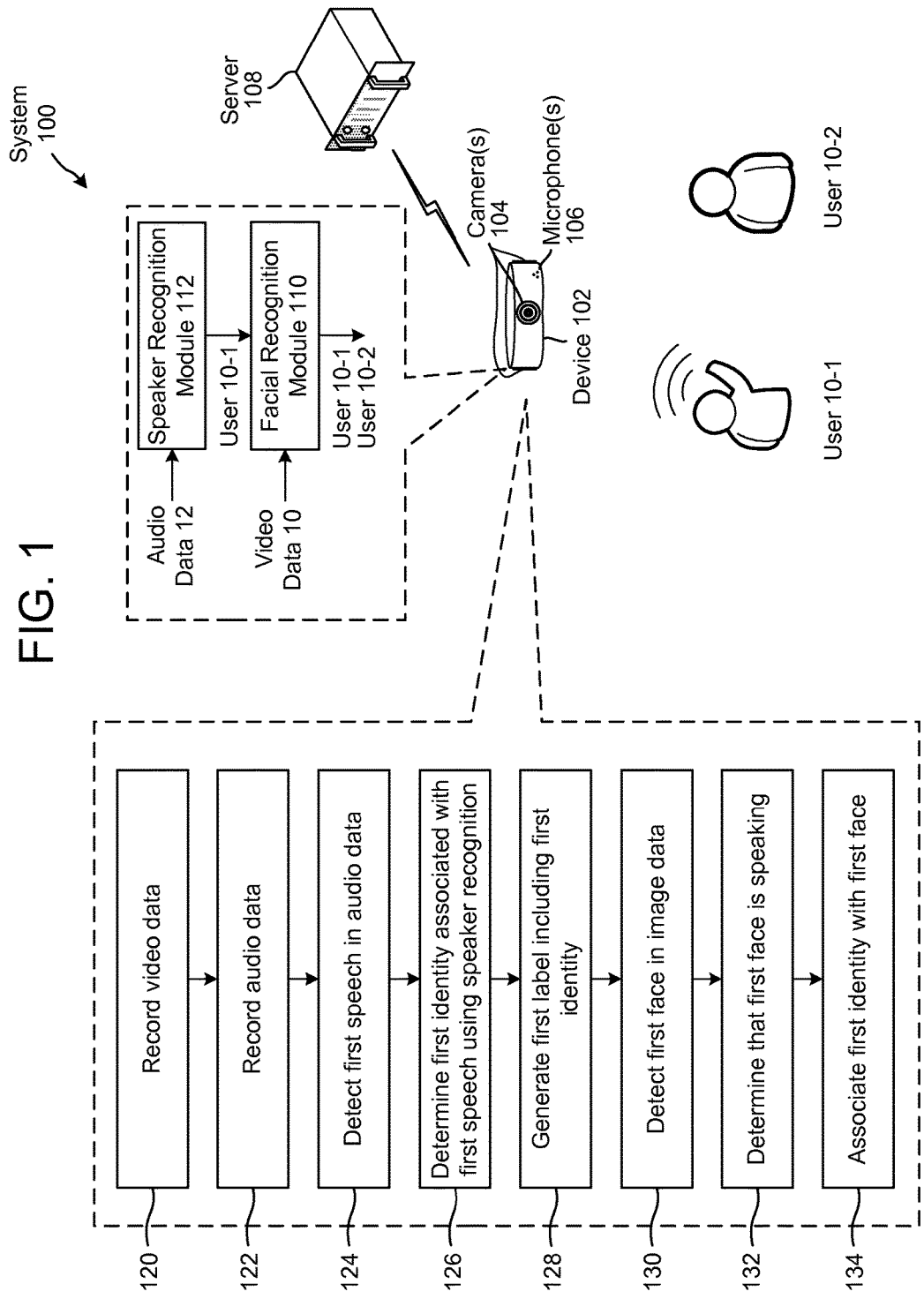
FIG. 1 illustrates an overview of a system for identifying a user based on voice and face according to embodiments of the present disclosure.

Electronic devices are commonly used to capture image/video data using one or more cameras and audio data using one or more microphones. Facial recognition may be used to identify individual users from image data and speaker recognition may be used to identify individual users from audio data. However, facial recognition and/or speaker recognition models must be trained in order to accurately determine an identity of each of the individual users. Models for facial recognition or speaker recognition may be pre-trained using training examples (e.g., image data with known faces or audio data with known speakers) for individual users associated with the electronic device. For example, an individual user may stand in front of a camera during a first registration process to train the facial recognition model, while separately the individual user may speak to a microphone during a second registration process to train the speaker recognition model. These registration processes may be time consuming and the facial recognition and/or speaker recognition models may generate inaccurate results for individual users without the registration process.

To improve facial recognition and/or speaker recognition models, devices, systems and methods are disclosed that improve a performance and/or simplify a training process for facial recognition and/or speaker recognition models by using results obtained from one model to assist in generating results from the other model. For example, a device may perform facial recognition on image data to identify user(s) and may use the results of the facial recognition to assist in speaker recognition for audio data corresponding to the image data. Alternatively or additionally, the device may perform speaker recognition on audio data to identify user(s) and may use the results of the speaker recognition to assist in facial recognition for image data corresponding to the audio data. As a result, the device may identify users in video data that are not included (or are only partially trained) in the facial recognition model and may identify users in audio data that are not included (or are only partially trained) in the speaker recognition model. Therefore, the device may cross-reference a facial database and a speaker database, may generate more accurate results without a registration process (e.g., pre-training) for one of the models and may perform training to update the facial recognition and/or speaker recognition models during run-time and/or offline using post-processed data.

In addition, the device may identify user(s) using a location of the user(s) relative to the device. For example, the device may use facial recognition to identify a first face at a first location and may use speaker recognition to identity a first voice at the first location. As the first face and the first voice are from the first location, the device may associate the first face and the first voice as corresponding to a single user. Therefore, if the device determines an identity of the user using one of the facial recognition or the speaker recognition, the device may associate the first face and the first voice with the identity. The device may generate a tag associated with the user and the tag may be used to generate a video summarization from input video data. For example, the tag may identify the user, a location of the user, a timestamp or period of time associated with the tag and other information, which the device or external devices may use to identify short video clips from the input video data and generate the video summarization.

FIG. 1 illustrates an overview of a system 100 for implementing embodiments of the disclosure. The system 100 includes a device 102 coupled to camera(s) 104, microphone(s) 106 and a server 108. While the following descriptions refer to the device 102 performing steps illustrated in the drawings, due to computing complexity the server 108 may perform the steps without departing from the present disclosure. As illustrated in FIG. 1, the device 102 may capture video data 10 using the camera(s) 104, may capture audio data 12 using the microphone(s) 106 and may recognize a first user 10-1 and a second user 10-2 using a combination of facial recognition and speaker recognition. For example, the device 102 may identify the first user 10-1 in the audio data 12 using a speaker recognition module 112 and may use the results from the speaker recognition module 112 to assist in identifying the first user 10-1 and the second user 10-2 in the video data 10 using a facial recognition module 110. The video data 12 may include image data for a plurality of images.

The device 102 may record (120) video data 10 using the camera(s) 104 and may record (122) audio data 12 using the microphone(s) 106. The device 102 may detect (124) first speech in the audio data 12 and may determine (126) a first identity associated with the first speech using speaker recognition. For example, the device 102 may detect a spoken utterance in the audio data 12 and may perform speaker recognition with the speaker recognition module 112 to determine that the first user 10-1 is associated with the spoken utterance. The speaker recognition module 112 may perform speaker recognition using various techniques known to one of skill in the art without departing from the disclosure.

The device 102 may generate (128) a first label including the first identity (e.g., first user 10-1). Optionally, as will be discussed in greater detail below with regard to FIGS. 8 and/or 9, the first label may include additional data generated by the speaker recognition module 112 that may be used by the facial recognition module 110. For example, the first label may include identities of speakers included in the audio data 12 as a whole, identities of speakers included in the audio data 12 associated with the first label, a confidence score associated with each of the identities (i.e., a score representing the system's confidence that the speaker is associated with the particular identity), an audio direction associated with each of the identities (i.e., a direction from which the particular audio associated with the identity was detected), a time frame within the audio data 12 associated with the first label and/or each of the identities, a quality of input associated with the audio data 12 and/or the like. The first label may be generated using the speaker recognition module 112 and may be input to the facial recognition module 110 to assist in performing facial recognition.

The device 102 may detect (130) a first face in image data, such as a digital image or a video frame from the video data 10. For ease of explanation, the following figures refer to performing facial recognition on image data taken from a frame of the video data 10, although the present disclosure is not limited thereto. The device 102 may determine (132) that the first face is speaking and may associate (134) the first identity (e.g., first user 10-1) with the first face. For example, the device 102 may use the facial recognition module 110 to detect a first face associated with the first user 10-1 and a second face associated with the second user 10-2 in a video frame from the video data 10. The device 102 may perform facial recognition using the facial recognition module 110 to determine an identity of the second face (e.g., associate the second face with the second user 10-2) but may be unable to determine an identity of the first face (e.g., unable to associate the first face with the first user 10-1). However, the facial recognition module 110 may determine that the speaker recognition module 112 identified the first identity at a first time based on the first label. The facial recognition module 110 may then determine that the first user 10-1 is speaking at the first time and associate the first identity (e.g., first user 10-1) generated by the speaker recognition module 112 with the first face.

The facial recognition module 110 may perform facial recognition using various techniques known to one of skill in the art without departing from the disclosure. After associating the first identity with the first face, the facial recognition module 110 may determine that the first identity is not included in a facial recognition database and may perform training to update the facial recognition database. For example, the device 102 may capture additional image data associated with the first identity from the video data 10 as training examples and may perform machine learning to improve the facial recognition model. Alternatively or additionally, the device 102 may receive additional image data associated with the first identity from tagged images available through personal or social media as training examples and may perform machine learning to improve the facial recognition model. The device 102 may acquire the additional image data and/or perform machine learning (e.g., a training process) during run-time (e.g., while the device 102 is capturing the video data 10) and/or offline (e.g., when the device 102 is not capturing the video data 10). Such training will be described in greater detail below with regard to FIGS. 2A-2D.

Figure 2A:
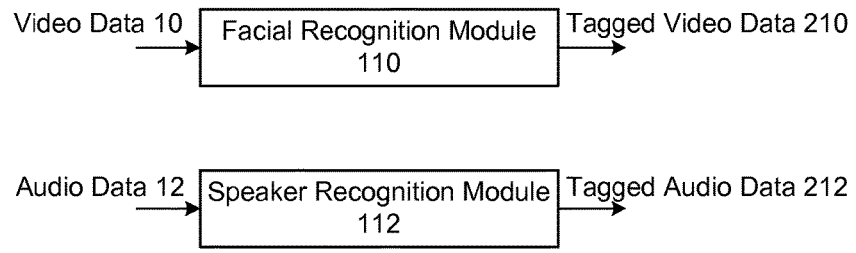
FIGS. 2A-2D illustrate example system diagrams for performing facial recognition and/or speaker recognition according to embodiments of the present disclosure.

FIGS. 2A-2D illustrate example system diagrams for performing facial recognition and/or speaker recognition according to embodiments of the present disclosure. As illustrated in FIG. 2A, typically a facial recognition module 110 performs facial recognition on video data 10 to identify faces within the video data 10 and generate tagged video 210, while independently a speaker recognition module 112 performs speaker recognition on audio data 12 to identify speakers within the audio data 12 and generate tagged audio 212. The facial recognition module 110 is trained and updated separately from the speaker recognition module 112 and a facial recognition database may include different identities than a speaker recognition database.

Figure 2B:
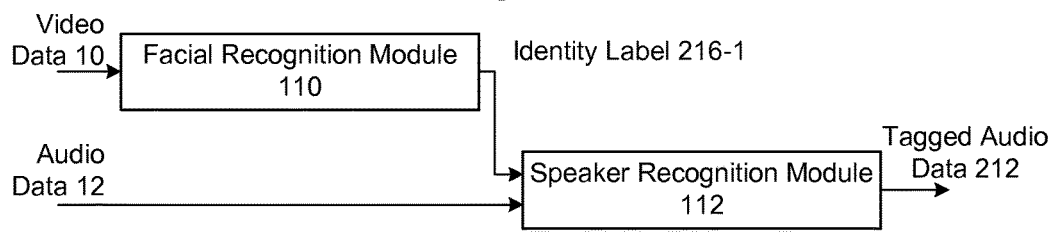

To improve a performance and/or simplify a training process for the speaker recognition module 112, FIG. 2B illustrates the facial recognition module 110 performing facial recognition on video data 10 to generate a first identity label 216-1 and output the first identity label 216-1 to the speaker recognition module 112. The speaker recognition module 112 may then perform speaker recognition using the first identity label 216-1 and the audio data 12 to identify speakers within the audio data 12, generate tagged audio data 212 and/or update the speaker recognition database. Thus, the output of the facial recognition module 110 may be used to improve run-time processing of the speaker recognition module 112, for run-time training of the speaker recognition module 112 (e.g., update the speaker recognition database during run-time processing) and/or for training the speaker recognition module 112 at a later point in time (e.g., update the speaker recognition database at some point in the future).

Figure 2C:
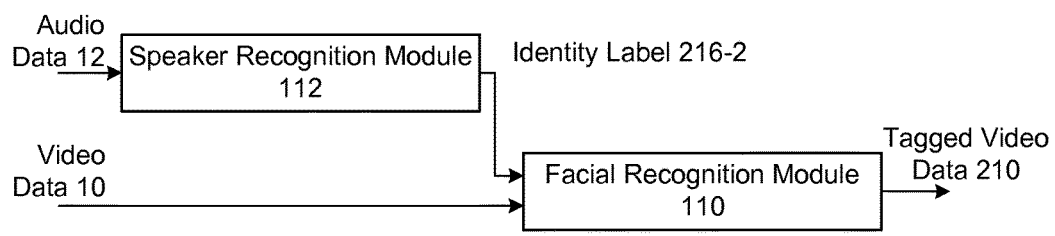

To improve a performance and/or simplify a training process for the facial recognition module 110, FIG. 2C illustrates the speaker recognition module 112 performing speaker recognition on audio data 12 to generate a second identity label 216-2 and output the second identity label 216-2 to the facial recognition module 110. The facial recognition module 110 may then perform facial recognition using the second identity label 216-2 and the video data 10 to identify faces within the video data 10, generate tagged video data 210 and/or update the facial recognition database. Thus, the output of the speaker recognition module 112 may be used to improve run-time processing of the facial recognition module 110, for run-time training of the facial recognition module 110 (e.g., update the facial recognition database during run-time processing) and/or for training the facial recognition module 110 at a later point in time (e.g., update the facial recognition database at some point in the future).

Figure 2D:
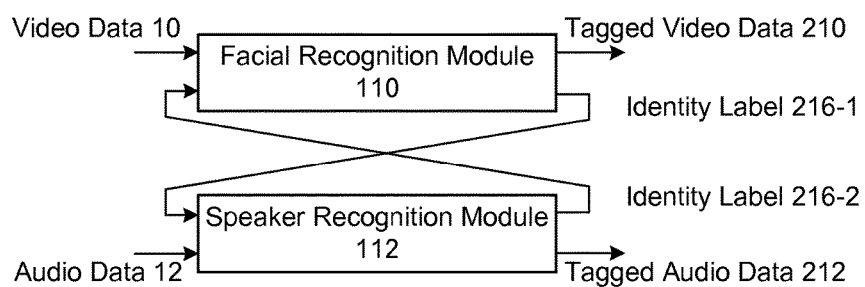

To improve a performance and/or simplify a training process for both the facial recognition module 110 and the speaker recognition module 112, FIG. 2D illustrates the facial recognition module 110 performing facial recognition using the second identity label 216-2 and the video data 10 to identify faces within the video data 10, generate the tagged video data 210, generate the first identity label 216-1 and/or update the facial recognition database. The speaker recognition module 112 may perform speaker recognition using the first identity label 216-1 and the audio data 12 to identify speakers within the audio data 12, generate tagged audio data 212, generate the second identity label 216-2 and/or update the speaker recognition database. Thus, the output of the facial recognition module 110 may be used to improve run-time processing of the speaker recognition module 112, for run-time training of the speaker recognition module 112 (e.g., update the speaker recognition database during run-time processing) and/or for training the speaker recognition module 112 at a later point in time (e.g., update the speaker recognition database at some point in the future), and the output of the speaker recognition module 112 may be used to improve run-time processing of the facial recognition module 110, for run-time training of the facial recognition module 110 (e.g., update the facial recognition database during run-time processing) and/or for training the facial recognition module 110 at a later point in time (e.g., update the facial recognition database at some point in the future).

As illustrated in FIGS. 2B-2D, the facial recognition module 110 may assist the speaker recognition module 112 and/or the speaker recognition module 112 may assist the facial recognition module 110. When the facial recognition module 110 determines that a face is not identified using the facial recognition database, the device 102 may capture image data associated with the unidentified face and may assign a unique identification to track the unidentified face. When the unidentified face is later associated with an identity, the image data and other information associated with the unique identification is merged with the identity and the facial recognition database is updated accordingly. Therefore, the facial recognition database may be updated retroactively using previously acquired image data when previously unidentified faces are associated with identities included in the facial recognition database.

When the facial recognition module 110 determines that an identity included in the speaker recognition database is not included in the facial recognition database, the device 102 may capture additional image data associated with the identity to perform machine learning to improve the facial recognition database. The additional image data may be captured from the video data 10 or received from tagged images available through personal or social media and may be used as training examples for the facial recognition database. For example, the facial recognition database may be a personalized database associated with the device 102. Thus, the device 102 may be linked to a customer profile, customer profile identification and/or other unique identification for one or more users and the facial recognition database may include identities of the one or more users associated with the device 102 and/or friends of the one or more users. When a friend is identified that isn't currently in the facial recognition database, the device 102 may acquire the additional image data and update the facial recognition database to include the friend without requiring a separate registration process. The device 102 may acquire the additional image data and/or perform machine learning (e.g., training process) during run-time (e.g., while the device 102 is capturing the video data 10) and/or offline (e.g., when the device 102 is not capturing the video data 10).

When the speaker recognition module 112 determines that a speaker is not identified using the speaker recognition database, the device 102 may capture audio data associated with the unidentified speaker and may assign a unique identification to track the unidentified speaker. When the unidentified speaker is later associated with an identity, the audio data and other information associated with the unique identification is merged with the identity and the speaker recognition database is updated accordingly. Therefore, the speaker recognition database may be updated retroactively using previously acquired audio data when previously unidentified speakers are associated with identities included in the speaker recognition database.

When the speaker recognition module 112 determines that an identity included in the facial recognition database is not included in the speaker recognition database, the device 102 may capture additional audio data associated with the identity to perform machine learning to improve the speaker recognition database. The additional audio data may be captured from the audio data 12, received from tagged videos (including corresponding audio) available through personal or social media and/or from recorded audio excerpts from voice calls to device contact information associated with the identity. The additional audio data may be used as training examples for the speaker recognition database. For example, the speaker recognition database may be a personalized database associated with the device 102. Thus, the device 102 may be linked to a customer profile, customer profile identification and/or other unique identification for one or more users and the speaker recognition database may include identities of the one or more users associated with the device 102 and/or friends of the one or more users. When a friend is identified that isn't currently in the speaker recognition database, the device 102 may acquire the additional audio data and update the speaker recognition database to include the friend without requiring a separate registration process. The device 102 may acquire the additional audio data and/or perform machine learning (e.g., training process) during run-time (e.g., while the device 102 is capturing the audio data 12) and/or offline (e.g., when the device 102 is not capturing the audio data 12). For example, the device 102 may update the speaker recognition database upon identifying a previously unknown speaker, periodically while capturing the audio data 12, upon termination of the audio data 12 or periodically based on a fixed time period for the device 102.

Various machine learning techniques may be used to recognize a face using facial recognition and/or a speaker using speaker recognition. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques. Many different training examples may be used during training. For example, as discussed above, additional image data and/or additional audio data may be acquired may be used as "ground truth" for the training examples. In some examples, the device 102 may determine a confidence score associated with the additional image data and/or additional audio data (e.g., a confidence level that the identity is correctly predicted by the device 102 based on the additional image data and/or additional audio data) and may use additional image data and/or additional audio data associated with a high confidence score (e.g., confidence score above 80%).

In some examples, the facial recognition module 110 and the speaker recognition module 112 may disagree on an identity. For example, speech associated with a user may be identified by the speaker recognition module 112 as belonging to a first user 10-1 while a face associated with the user may be identified by the facial recognition module 110 as belonging to a second user 10-2. In response to the conflicting input, the facial recognition module 110 and/or speaker recognition module 112 may use separate identities or may select the identity having a highest confidence score between the first user 10-1 and the second user 10-2. As the facial recognition module 110 and the speaker recognition module 112 track unique users, a misidentification may be corrected retroactively and the facial recognition database and/or the speaker recognition database updated accordingly.

In certain embodiments, direction information may be used to assist in speaker recognition/facial recognition. For example, the device 102 may be configured with a number of components designed to provide direction information related to the capture and processing of speech. FIG. 3 illustrates details of microphone and speaker positioning in an example embodiment of the device 102. In this embodiment, the device 102 includes a microphone array 308 having four microphones 106 that are laterally spaced from each other so that they can be used by audio beamforming components to produce directional audio signals. The microphones 106 may, in some instances, be dispersed around a perimeter of the device 102 in order to apply beampatterns to audio signals based on sound captured by the microphone(s) 106. In the illustrated embodiment, the microphones 106 are positioned at spaced intervals along a perimeter of the device 102, although the present disclosure is not limited thereto. In some examples, the microphone(s) 106 may be spaced between the camera(s) 104 on a substantially vertical surface 304 of the device 102 and/or a top surface 306 of the device 102. In other examples, the microphone(s) 106 may be grouped with the camera(s) 104 (e.g., aligned with or spaced in close proximity to the camera(s) 104) on a substantially vertical surface 304 of the device 102 and/or a top surface 306 of the device 102. Each of the microphones 106 is omnidirectional in the described embodiment, and beamforming technology is used to produce directional audio signals based on signals form the microphones 106. In other embodiments, the microphones may have directional audio reception, which may remove the need for subsequent beamforming.

In various embodiments, the microphone array 308 may include greater or less than the number of microphones shown. For example, an additional microphone may be located in the center of the top surface 306 and used in conjunction with peripheral microphones for producing directionally focused audio signals.

Speaker(s) 302 may be located at the bottom of the device 102, and may be configured to emit sound omnidirectionally, in a 360 degree pattern around the device 102. For example, the speaker(s) 302 may comprise a round speaker element directed downwardly in the lower part of the device 102.

Using the microphone array 308 and the plurality of microphones 106 the device 102 may employ beamforming techniques to isolate desired sounds for purposes of converting those sounds into audio signals for speech processing by the system. Beamforming is the process of applying a set of beamformer coefficients to audio signal data to create beampatterns, or effective directions of gain or attenuation. In some implementations, these volumes may be considered to result from constructive and destructive interference between signals from individual microphones in a microphone array.

The device 102 may include an audio processing module that may include one or more audio beamformers or beamforming components that are configured to generate an audio signal that is focused in a direction from which user speech has been detected. More specifically, the beamforming components may be responsive to spatially separated microphone elements of the microphone array 308 to produce directional audio signals that emphasize sounds originating from different directions relative to the device 102, and to select and output one of the audio signals that is most likely to contain user speech.

Audio beamforming, also referred to as audio array processing, uses a microphone array having multiple microphones that are spaced from each other at known distances.

Sound originating from a source is received by each of the microphones. However, because each microphone is potentially at a different distance from the sound source, a propagating sound wave arrives at each of the microphones at slightly different times. This difference in arrival time results in phase differences between audio signals produced by the microphones. The phase differences can be exploited to enhance sounds originating from chosen directions relative to the microphone array.

Beamforming uses signal processing techniques to combine signals from the different microphones so that sound signals originating from a particular direction are emphasized while sound signals from other directions are deemphasized. More specifically, signals from the different microphones are combined in such a way that signals from a particular direction experience constructive interference, while signals from other directions experience destructive interference. The parameters used in beamforming may be varied to dynamically select different directions, even when using a fixed-configuration microphone array.

A given beampattern may be used to selectively gather signals from a particular spatial location where a signal source is present. The selected beampattern may be configured to provide gain or attenuation for the signal source. For example, the beampattern may be focused on a particular user's head allowing for the recovery of the user's speech while attenuating noise from an operating air conditioner that is across the room and in a different direction than the user relative to a device that captures the audio signals.

Such spatial selectivity by using beamforming allows for the rejection or attenuation of undesired signals outside of the beampattern. The increased selectivity of the beampattern improves signal-to-noise ratio for the audio signal. By improving the signal-to-noise ratio, the accuracy of speaker recognition performed on the audio signal is improved.

The processed data from the beamformer module may then undergo additional filtering or be used directly by other modules. For example, a filter may be applied to processed data which is acquiring speech from a user to remove residual audio noise from a machine running in the environment.

Figure 4:
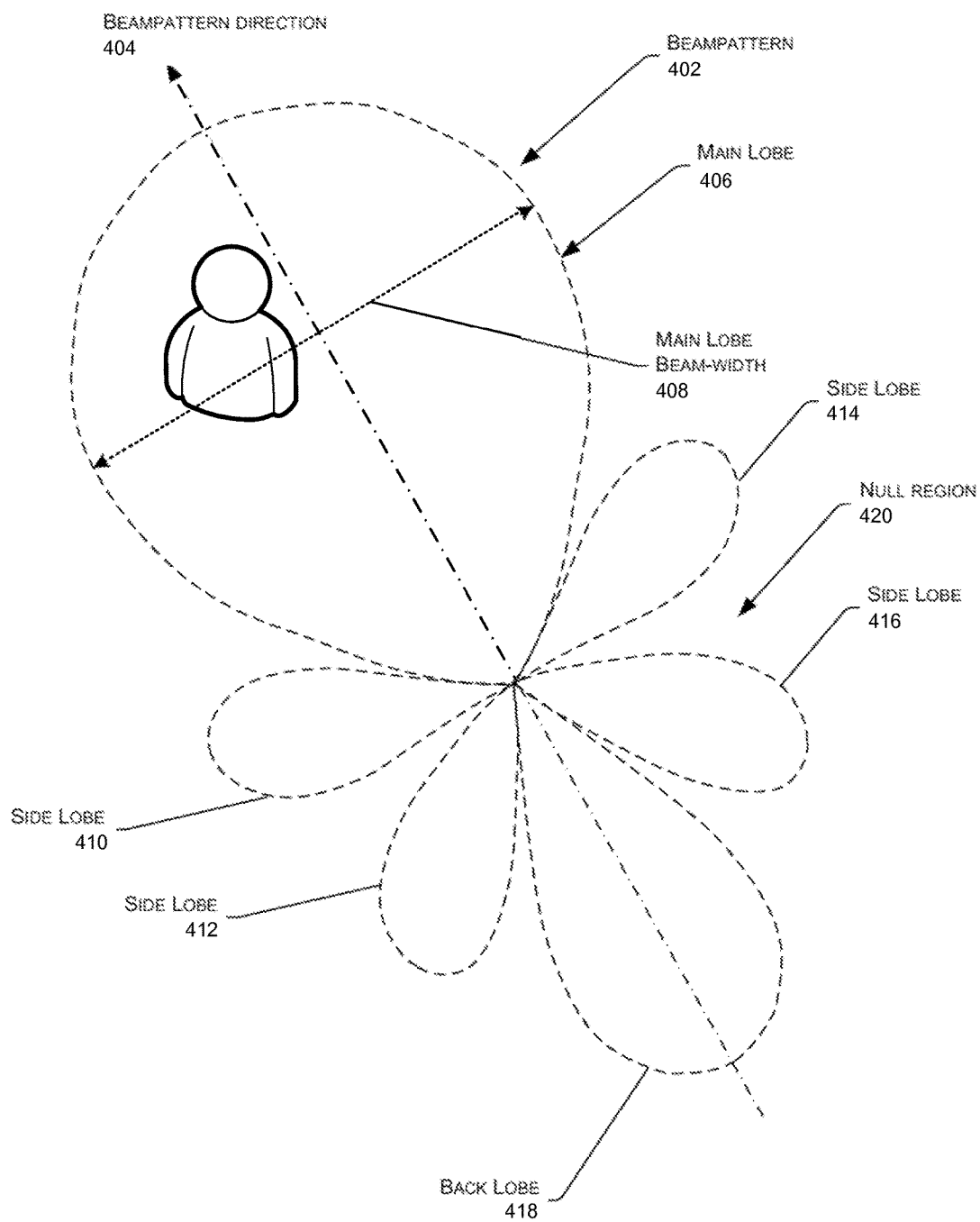
FIG. 4 is an illustration of beamforming according to embodiments of the present disclosure.

FIG. 4 illustrates a schematic of a beampattern 402 formed by applying beamforming coefficients to signal data acquired from a microphone array of the device 102. As mentioned above, the beampattern 402 results from the application of a set of beamformer coefficients to the signal data. The beampattern generates directions of effective gain or attenuation. In this illustration, the dashed line indicates isometric lines of gain provided by the beamforming coefficients. For example, the gain at the dashed line here may be +12 decibels (dB) relative to an isotropic microphone.

The beampattern 402 may exhibit a plurality of lobes, or regions of gain, with gain predominating in a particular direction designated the beampattern direction 404. A main lobe 406 is shown here extending along the beampattern direction 404. A main lobe beam-width 408 is shown, indicating a maximum width of the main lobe 406. In this example, the beampattern 402 also includes side lobes 410, 412, 414, and 416. Opposite the main lobe 406 along the beampattern direction 404 is the back lobe 418. Disposed around the beampattern 402 are null regions 420. These null regions are areas of attenuation to signals. In the example, the user 10 resides within the main lobe 406 and benefits from the gain provided by the beampattern 402 and exhibits an improved SNR ratio compared to a signal acquired with non-beamforming. In contrast, if the user 10 were to speak from a null region, the resulting audio signal may be significantly reduced. As shown in this illustration, the use of the beampattern provides for gain in signal acquisition compared to non-beamforming. Beamforming also allows for spatial selectivity, effectively allowing the system to "turn a deaf ear" on a signal which is not of interest. Beamforming may result in directional audio signal(s) that may then be processed by other components of the device 102 and/or system 100.

While beamforming alone may increase a signal-to-noise (SNR) ratio of an audio signal, combining known acoustic characteristics of an environment (e.g., a room impulse response (RIR)) and heuristic knowledge of previous beampattern lobe selection may provide an even better indication of a speaking user's likely location within the environment. In some instances, a device includes multiple microphones that capture audio signals that include user speech. As is known and as used herein, "capturing" an audio signal includes a microphone transducing audio waves of captured sound to an electrical signal and a codec digitizing the signal. The device may also include functionality for applying different beampatterns to the captured audio signals, with each beampattern having multiple lobes. By identifying lobes most likely to contain user speech using the combination discussed above, the techniques enable devotion of additional processing resources of the portion of an audio signal most likely to contain user speech to provide better echo canceling and thus a cleaner SNR ratio in the resulting processed audio signal.

To determine a value of an acoustic characteristic of an environment (e.g., an RIR of the environment), the device 102 may emit sounds at known frequencies (e.g., chirps, text-to-speech audio, music or spoken word content playback, etc.) to measure a reverberant signature of the environment to generate an RIR of the environment. Measured over time in an ongoing fashion, the device may be able to generate a consistent picture of the RIR and the reverberant qualities of the environment, thus better enabling the device to determine or approximate where it is located in relation to walls or corners of the environment (assuming the device is stationary). Further, if the device is moved, the device may be able to determine this change by noticing a change in the RIR pattern. In conjunction with this information, by tracking which lobe of a beampattern the device most often selects as having the strongest spoken signal path over time, the device may begin to notice patterns in which lobes are selected. If a certain set of lobes (or microphones) is selected, the device can heuristically determine the user's typical speaking position in the environment. The device may devote more CPU resources to digital signal processing (DSP) techniques for that lobe or set of lobes. For example, the device may run acoustic echo cancelation (AEC) at full strength across the three most commonly targeted lobes, instead of picking a single lobe to run AEC at full strength. The techniques may thus improve subsequent automatic speech recognition (ASR) and/or speaker recognition results as long as the device is not rotated or moved. And, if the device is moved, the techniques may help the device to determine this change by comparing current RIR results to historical ones to recognize differences that are significant enough to cause the device to begin processing the signal coming from all lobes approximately equally, rather than focusing only on the most commonly targeted lobes.

By focusing processing resources on a portion of an audio signal most likely to include user speech, the SNR of that portion may be increased as compared to the SNR if processing resources were spread out equally to the entire audio signal. This higher SNR for the most pertinent portion of the audio signal may increase the efficacy of the device 102 when performing speaker recognition on the resulting audio signal.

Using the beamforming and directional based techniques above, the system may determine a direction of detected audio relative to the audio capture components. Such direction information may be used to link speech/a recognized speaker identity to video data as described below.

FIGS. 5A-5C illustrate examples of determining directions of faces and speech according to embodiments of the present disclosure. As illustrated in FIG. 5A, the device 102 may capture video data 10 in 360 degrees around the device 102 using camera(s) 104, such that the field of view (FOV) 500 includes Quadrant 1, Quadrant 2, Quadrant 3 and Quadrant 4. However, the present disclosure is not limited thereto and the device 102 may capture video data 10 in a wide FOV around the device 102 (e.g., from 180 degrees to 360 degrees) without departing from the present disclosure. In addition, the device 102 may capture audio data 12 in 360 degrees around the device 102 using the microphone(s) 106. Therefore, the device 102 may capture video data 10 and audio data 12 including a first user 10-1, a second user 10-2, a third user 10-3, a fourth user 10-4 and a fifth user 10-5.

As illustrated in FIG. 5B, the device 102 may detect a first face 522-1 (associated with the first user 10-1), a second face 522-2 (associated with the second user 10-2), a third face 522-3 (associated with the third user 10-3), a fourth face 522-4 (associated with the fourth user 10-4) and a fifth face 522-5 (associated with the fifth user 10-5). Using techniques known to one of skill in the art, the device 102 may determine a first face direction 524-1 to the first face 522-1, a second face direction 524-2 to the second face 522-2, a third face direction 524-3 to the third face 522-3, a fourth face direction 524-4 to the fourth face 522-4 and a fifth face direction 524-5 to the fifth face 522-5, the directions 524 relative to the device 102.

As illustrated in FIG. 5C, the device 102 may detect first speech 532-1 (associated with the first user 10-1) and second speech 532-2 (associated with the fifth user 10-5). In this example, the second user 10-2, third user 10-3 and fourth user 10-4 may be silent during a period of time and therefore may not be included in the audio data 12. Using techniques known to one of skill in the art or disclosed in greater detail above with regard to FIGS. 3 and 4, the device 102 may determine a first speech direction 534-1 to the first speech 532-1 and a second speech direction 534-2 to the second speech 532-2, the directions 534 relative to the device 102.

In some examples, the device 102 may identify the first user 10-1 and associate the first user 10-1 with the first face 522-1 and the first speech 532-1 based on the first face direction 524-1 and the first speech direction 534-1, despite the first user 10-1 not being included in the speaker recognition database. For example, the device 102 may identify the first user 10-1 from the first face 522-1 using facial recognition, may identify that the first face 522-1 is talking during the first speech 532-1, may determine that the first face direction 524-1 matches the first speech direction 534-1 and may therefore associate the first user 10-1 with the first face 522-1 and the first speech 532-1.

In other examples, the device 102 may identify the fifth user 10-5 and associate the fifth user 10-5 with the fifth face 522-5 and the second speech 532-2 based on the fifth face direction 524-5 and the second speech direction 534-2, despite the fifth user 10-5 not being included in the facial recognition database. For example, the device 102 may identify the fifth user 10-5 from the second speech 532-2 using speaker recognition, may identify that the fifth face 522-5 is talking during the second speech 532-2, may determine that the fifth face direction 524-5 matches the second speech direction 534-2 and may therefore associate the fifth user 10-5 with the fifth face 522-5 and the second speech 532-2.

Figure 6:
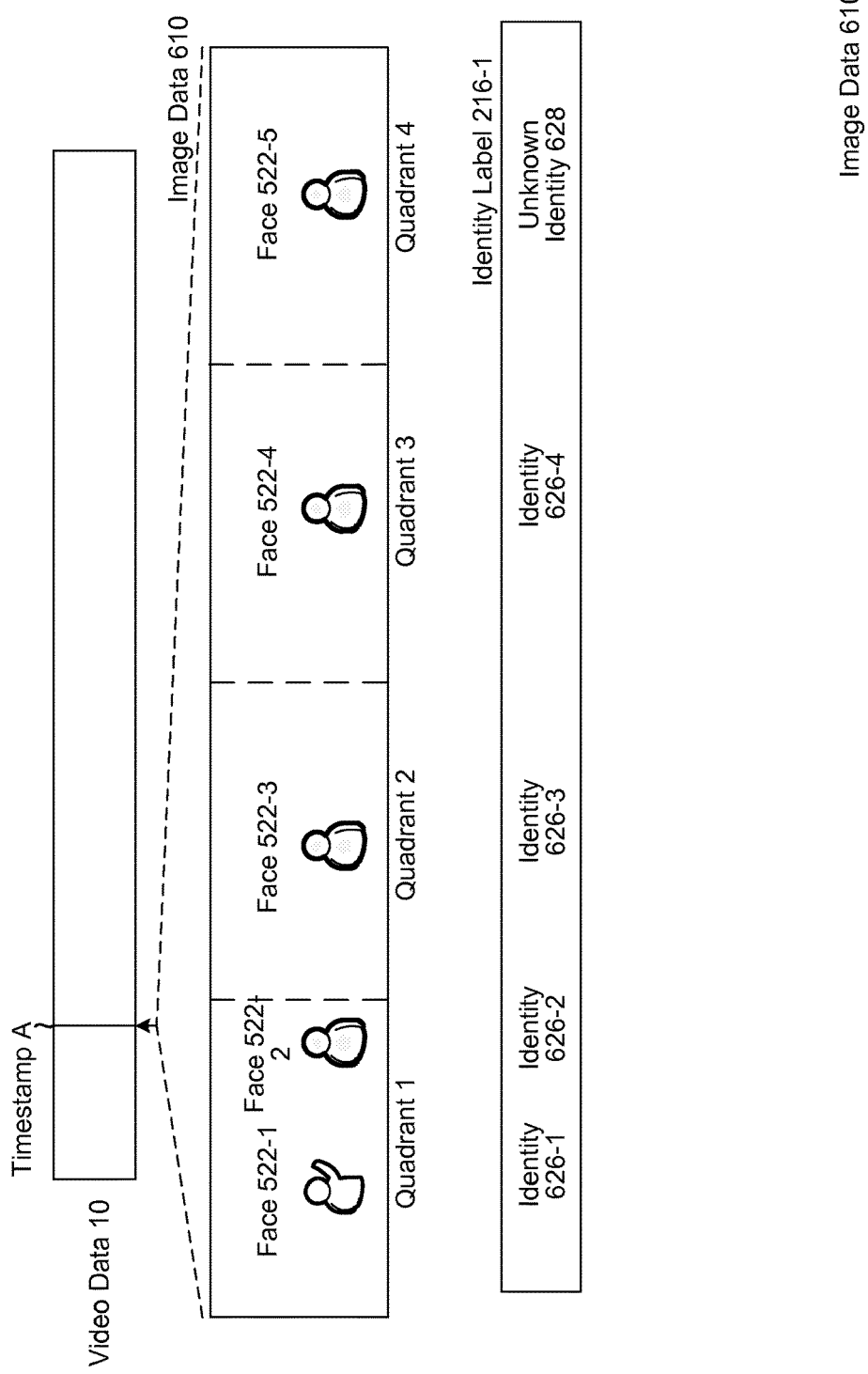
FIG. 6 illustrates an example of generating an identity label from image data according to embodiments of the present disclosure.

FIG. 6 illustrates an example of generating an identity label from image data according to embodiments of the present disclosure. As illustrated in FIG. 6, the device 102 may receive image data 610 associated with Timestamp A of the video data 10. As shown the image data 610 may include image data from multiple cameras associated with the device 102, for example one camera for Quadrant 1, one camera for Quadrant 2, one camera for Quadrant 3 and one camera for Quadrant 4. Using facial recognition, the device 102 may detect, in the image data 610, the first face 522-1, the second face 522-2, the third face 522-3, the fourth face 522-4 and the fifth face 522-5, and may associate the first face 522-1 with the first identity 626-1, the second face 522-2 with the second identity 626-2, the third face 522-3 with the third identity 626-3 and the fourth face 522-4 with the fourth identity 626-4. However, the fifth face 522-5 may not be in the facial recognition database and therefore the device 102 may assign unknown identity 628 to the fifth face 522-5.

The device 102 may generate the first identity label 216-1, which may include the first identity 626-1, the second identity 626-2, the third identity 626-3, the fourth identity 626-4 and the unknown identity 628, Timestamp A and optionally, additional information discussed in greater detail below with regard to FIG. 8. Alternatively, the device may generate multiple identity labels (not shown) for each identity determined from the image data 610, where each of the labels is associated with Timestamp A.

Figure 7:
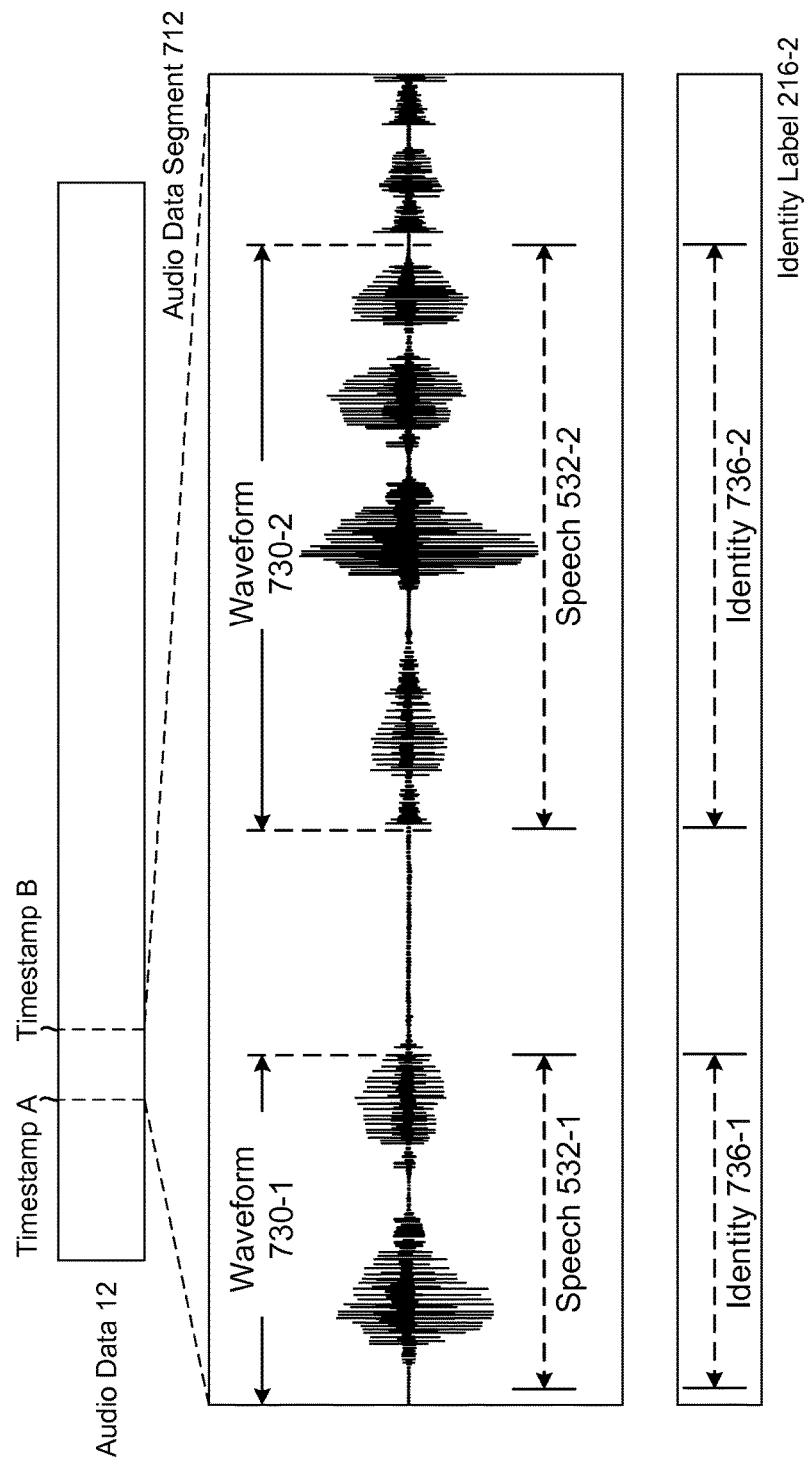
FIG. 7 illustrates an example of generating an identity label from audio data according to embodiments of the present disclosure.

FIG. 7 illustrates an example of generating an identity label from audio data according to embodiments of the present disclosure. As illustrated in FIG. 7, the device 102 may receive an audio data segment 712 between Timestamp A and Timestamp B of the audio data 12. Using speaker recognition, the device 102 may detect a first waveform 730-1 and a second waveform 730-2, may associate the first waveform 730-1 with the first speech 532-1 and the second waveform 730-2 with the second speech 532-2, and may associate the first speech 532-1 with a first identity 636-1 and the second speech 532-2 with a second identity 636-2.

The device 102 may generate the second identity label 216-2, which may include the first identity 636-1 and the second identity 636-2, an indication that the second identity label 216-2 extends between Timestamp A and Timestamp B, and optionally, additional information discussed in greater detail below with regard to FIG. 8. Alternatively, the device may generate multiple identity labels (not shown) for each identity determined from the audio data segment 712, where each of the labels is associated with the time between Timestamp A and Timestamp B.

Figure 8:
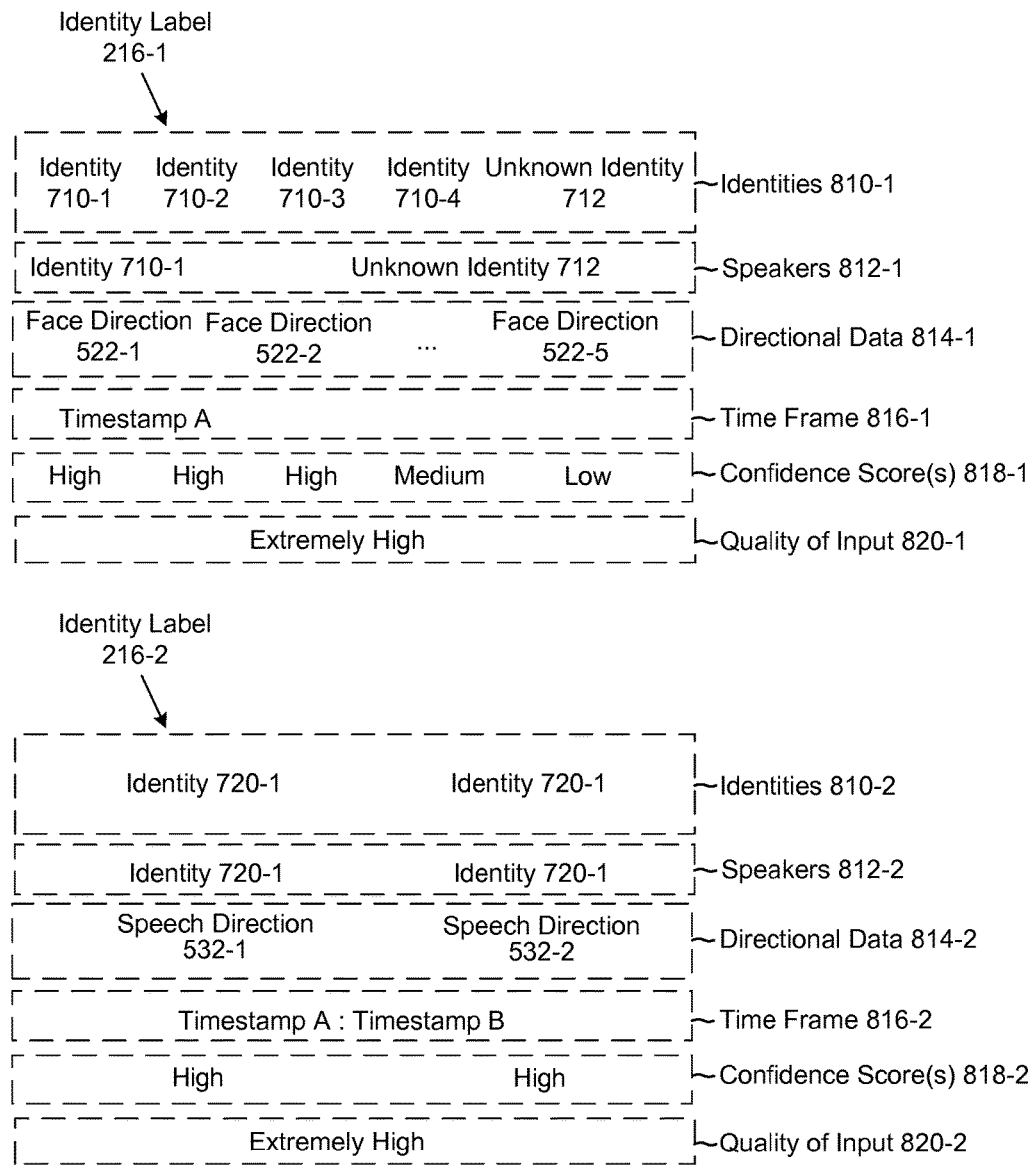
FIG. 8 illustrates examples of identity labels according to embodiments of the present disclosure.

FIG. 8 illustrates examples of identity labels according to embodiments of the present disclosure. As illustrated in FIG. 8, a first identity label 216-1 may be generated based on facial recognition and may include identities 810-1, speakers 812-1, directional data 814-1, time frame 816, confidence score(s) 818 and/or quality of input 820. For example, the identities 810-1 may include identities for each unique face identified in the image data, and the speakers 812-1 may include identities for each unique face determined to be speaking. While facial recognition may be performed on image data (e.g., a single video frame), the device 102 may determine if the face is speaking using video data (e.g., multiple video frames) using techniques known to one of skill in the art. The directional data 814-1 may include vectors or other direction information identifying a direction to each unique face relative to the device 102. The time frame 816-1 may identify a time frame associated with the first identity label 216-1, such as a single timestamp or a duration of time. For example, the first identity label 216-1 may include information from facial recognition performed on multiple video frames during the duration of time. The confidence score(s) 818-1 may be associated with the identities 810-1 and may include a confidence score identifying a confidence level that a face (identified based on the directional data 814-1) is associated with the correct identity. The quality of input 818-1 may identify a measure of quality associated with the input, indicating that the input can be used with accuracy. For example, poor contrast in the video data 10 may result in less accurate results relative to high contrast and therefore the poor contrast may be identified as having a low quality of input.

A second identity label 216-2 may be generated based on speaker recognition and may include identities 810-2, speakers 812-2, directional data 814-2, time frame 816, confidence score(s) 818 and/or quality of input 820. For example, the identities 810-2 may include identities for each unique speaker identified in the audio data, while the speakers 812-2 may include identities for each unique speaker identified in the time frame 816. However, the disclosure is not limited thereto and the identities 810-2 may be identical to the speakers 812-2 for the second identity label 216-2. The directional data 814-2 may include vectors or other direction information identifying a direction associated with each speaker relative to the device 102. The time frame 816-2 may identify a time frame associated with the second identity label 216-2, such as a duration of time. For example, the second identity label 216-2 may include information from speaker recognition performed on the audio data during the duration of time. The confidence score(s) 818-2 may be associated with the identities 810-2 and may include a confidence score identifying a confidence level that a speaker (identified based on the directional data 814-2) is associated with the correct identity. The quality of input 818-2 may identify a measure of quality associated with the input, indicating that the input can be used with accuracy. For example, a noisy environment with multiple conflicting speakers in the audio data 12 may result in less accurate results relative to a quiet environment with individual speakers and therefore the noisy environment may be identified as having a low quality of input.

As illustrated in FIGS. 9-12 and discussed in greater detail below, the second identity label 216-2 may be used by the facial recognition module 110 to perform facial recognition. For example, the facial recognition module 110 may associate a first identity included in the second identity label 216-2 with a first face included in video data. In some examples, the facial recognition module 110 may determine that the first face corresponds to first speech associated with the first identity and may therefore associate the first identity with the first face. For example, the facial recognition module 110 may determine that a first location associated with the first face matches a second location associated with the first speech and associate the first identity with the first face. In other examples, the facial recognition module 110 may determine potential identities for the first face, determine that the first identity included in the second identity label 216-2 is one of the potential identities and associate the first identity with the first face. Alternatively or additionally, in some examples the facial recognition module 110 may determine the potential identities based on identities included in the second identity label 216-2 and select an identity having a highest confidence score based on the facial recognition.

Associating the first identity with the first face may include directly associating the first identity with the first face, effectively substituting the first identity for potential identities determined by the facial recognition module 110. However, the present disclosure is not limited thereto and the facial recognition module 110 may associate the first identity with the first face by increasing a weight or confidence score associated with the first identity without departing from the present disclosure. For example, the facial recognition module 110 may perform facial recognition and determine a first confidence score indicating a likelihood that the first identity is associated with the first face. Based on the first identity being included in the second identity label 216-2, the facial recognition module 110 may increase the first confidence score. Thus, in some examples the facial recognition module 110 may determine that the first face corresponds to the first speech associated with the first identity and may therefore increase the first confidence score associated with the first identity. In other examples, the facial recognition module 110 may determine potential identities for the first face, determine that the first identity included in the second identity label 216-2 is one of the potential identities and may increase the first confidence score associated with the first identity. Alternatively or additionally, in some examples the facial recognition module 110 may increase confidence scores associated with each identity included in the second identity label 216-2. While increasing the confidence score may increase a likelihood that the first identity is associated with the first face, this enables more accurate results from the facial recognition as the facial recognition module 110 may determine that a second confidence score associated with a second identity exceeds the increased first confidence score.

As illustrated in FIGS. 13-16 and discussed in greater detail below, the first identity label 216-1 may be used by the speaker recognition module 112 to perform speaker recognition. For example, the speaker recognition module 112 may associate a first identity included in the first identity label 216-1 with first speech included in audio data. In some examples, the speaker recognition module 112 may determine that the first speech corresponds to a first face associated with the first identity and may therefore associate the first identity with the first speech. For example, the speaker recognition module 112 may determine that a first location associated with the first speech matches a second location associated with the first face and associate the first identity with the first speech. In other examples, the speaker recognition module 112 may determine potential identities for the first speech, determine that the first identity included in the first identity label 216-1 is one of the potential identities and associate the first identity with the first face. Alternatively or additionally, in some examples the speaker recognition module 112 may determine the potential identities based on identities included in the first identity label 216-1 and select an identity having a highest confidence score based on the speaker recognition.

Associating the first identity with the first speech may include directly associating the first identity with the first speech, effectively substituting the first identity for potential identities determined by the speaker recognition module 112. However, the present disclosure is not limited thereto and the speaker recognition module 112 may associate the first identity with the first speech by increasing a weight or confidence score associated with the first identity without departing from the present disclosure. For example, the speaker recognition module 112 may perform speaker recognition and determine a first confidence score indicating a likelihood that the first identity is associated with the first speech. Based on the first identity being included in the first identity label 216-1, the speaker recognition module 112 may increase the first confidence score. Thus, in some examples the speaker recognition module 112 may determine that the first speech corresponds to the first face associated with the first identity and may therefore increase the first confidence score associated with the first identity. In other examples, the speaker recognition module 112 may determine potential identities for the first speech, determine that the first identity included in the first identity label 216-1 is one of the potential identities and may increase the first confidence score associated with the first identity. Alternatively or additionally, in some examples the speaker recognition module 112 may increase confidence scores associated with each identity included in the first identity label 216-1. While increasing the confidence score may increase a likelihood that the first identity is associated with the first speech, this enables more accurate results from the speaker recognition as the speaker recognition module 112 may determine that a second confidence score associated with a second identity exceeds the increased first confidence score.

FIG. 9 is a flowchart conceptually illustrating an example method for generating an identification label according to embodiments of the present disclosure. As illustrated in FIG. 9, the device 102 may receive (910) audio data, detect (912) first speech included in the audio data, and determine (914) a first identity associated with the first speech using speaker recognition. Optionally, the device 102 may determine (916) a confidence score associated with the first identity, determine (918) that the confidence score exceeds a threshold, determine (920) a quality of audio data and determine (922) an audio direction using beamforming. The device 102 may generate (924) a second label (e.g., second identification label 216-2) including the first identity, a timestamp or duration of time associated with the second label and optionally the confidence score, quality of audio and audio direction. The device 102 may then perform (926) facial recognition using the second label.

FIGS. 10A-10D are flowcharts conceptually illustrating example methods for using speaker recognition to assist facial recognition according to embodiments of the present disclosure.

Figure 10A:
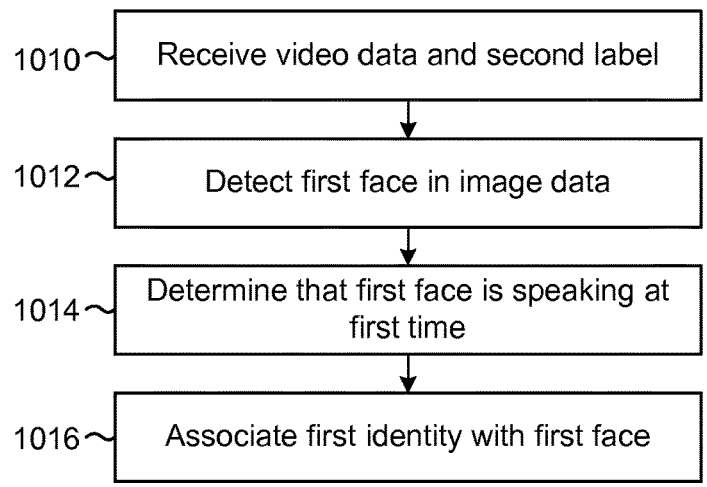

FIG. 10A illustrates an example of a result of the speaker recognition being used to identify a face without using facial recognition. For example, a confidence score associated with the first identity determined in FIG. 9 may be high and the device 102 may therefore determine that the first identity is accurate. As illustrated in FIG. 10A, the device 102 may receive (1010) video data and the second label generated in FIG. 9. The device 102 may then detect (1012) a first face in image data associated with the video data, may determine (1014) that the first face is speaking at the first time and may associate (1016) the first identity with the first face.

Figure 10B:
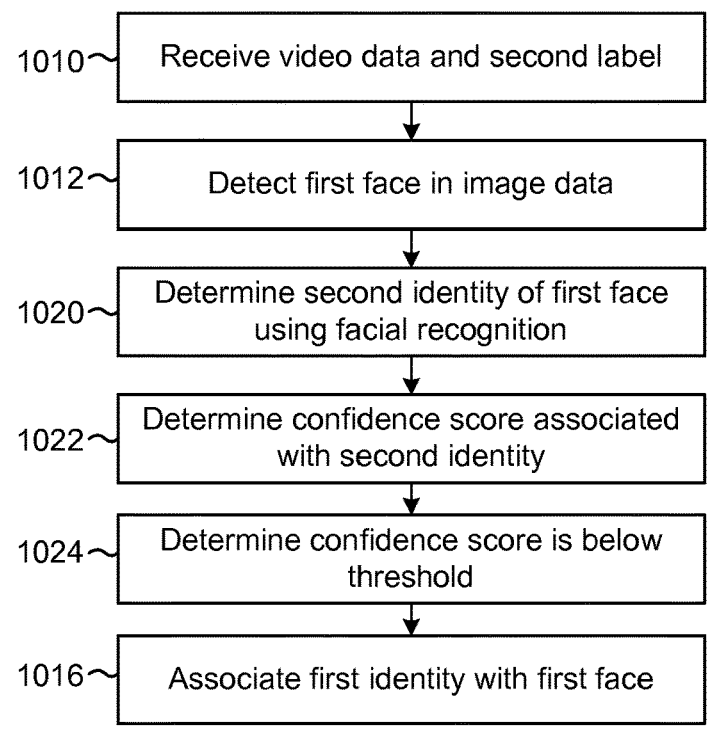

FIG. 10B illustrates an example of a result of the speaker recognition being used to identify a face that was not accurately identified using facial recognition. For example, the facial recognition may result in a low confidence score and the device 102 may associate the first identity determined in FIG. 9 with the face. As illustrated in FIG. 10B, the device 102 may receive (1010) the video data and the second label and may detect (1012) the first face in the image data. The device 102 may determine (1020) a second identity of the first face using facial recognition, may determine (1022) a confidence score associated with the second identity and determine (1024) that the confidence score is below a threshold. As a result, the device 102 may associate (1016) the first identity with the first face.

FIG. 10C illustrates an example of a result of the speaker recognition being used to select an identity from a group. For example, the facial recognition may associate a face with multiple identities and the device 102 may select the first identity determined in FIG. 9 from the multiple identities. As illustrated in FIG. 10C, the device 102 may receive (1010) the video data and the second label and may detect (1012) the first face in the image data. The device 102 may then determine (1030) potential identities using facial recognition, determine (1032) that the first identity is included in the potential identities and associate (1016) the first identity with the first face.

FIG. 10D illustrates an example of a result of the speaker recognition being associated with a face based on the audio direction matching a video direction. For example, the speaker recognition may include an audio direction (e.g., direction from the device 102 to the speaker) in the second label and the facial recognition may identify a video direction associated with a face, determine that the video direction is equal to the audio direction and associate the first identity with the face. As illustrated in FIG. 10D, the device 102 may receive (1010) the video data and the second label (including an audio direction associated with the first identity) and may detect (1012) the first face in the image data. The device 102 may then determine (1040) a video direction to the first face, determine (1042) that the video direction matches the audio direction and associate (1016) the first identity with the first face.

Figure 11A:
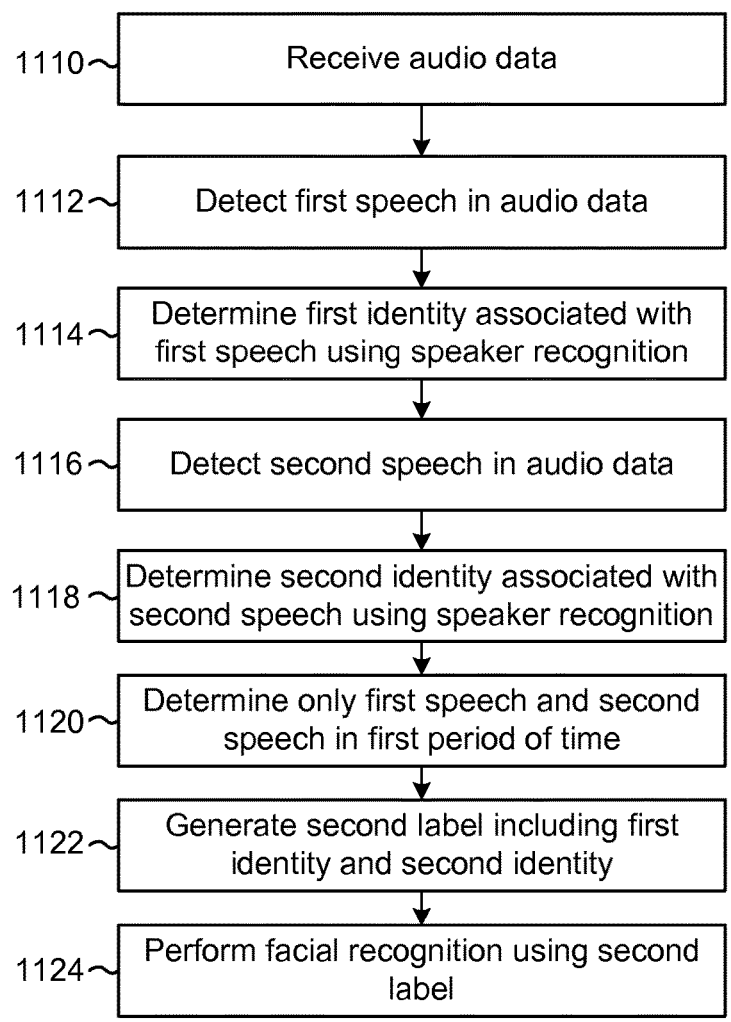
FIGS. 11A-11B are flowcharts conceptually illustrating example methods for using speaker recognition to assist facial recognition according to embodiments of the present disclosure.
Figure 11B:
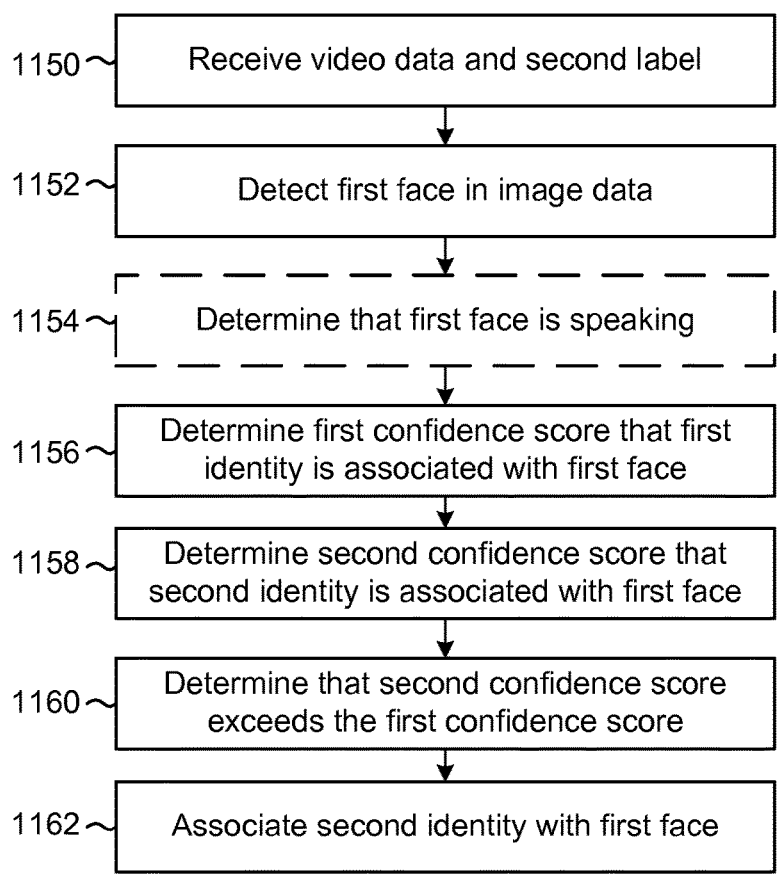

FIGS. 11A-11B are flowcharts conceptually illustrating example methods for using speaker recognition to assist facial recognition according to embodiments of the present disclosure. While FIG. 9 illustrated an example of the speaker recognition generating a second label including a single identity, FIG. 11A illustrates an example of the speaker recognition generating a second label including multiple identities. Therefore, instead of the device 102 associating the single identity with a first face (as discussed above with regard to FIGS. 10A-10D), FIG. 11B illustrates the device 102 using the multiple identities to narrow results from the facial recognition.

As illustrated in FIG. 11A, the device 102 may receive (1110) audio data, may detect (1112) first speech in the audio data and may determine (1114) a first identity associated with the first speech using speaker recognition. In addition, the device 102 may detect (1116) second speech in the audio data, determine (1118) a second identity associated with the second speech using the speaker recognition, and determine (1120) that the audio data only includes the first speech and the second speech in a first period of time. Therefore, the device 102 may generate (1122) a second label including the first identity and the second identity and perform (1124) facial recognition using the second label.

As illustrated in FIG. 11B, the device 102 may receive (1150) video data and the second label, detect (1152) a first face in image data associated with the video data and optionally determine (1154) that the first face is speaking. The device 102 may then determine (1156) a first confidence score that the first identity is associated with the first face, determine (1158) a second confidence score that the second identity is associated with the first face and determine (1160) that the second confidence score exceeds the first confidence score. As a result, the device 102 may associate (1162) the second identity with the first face.

Figure 12:
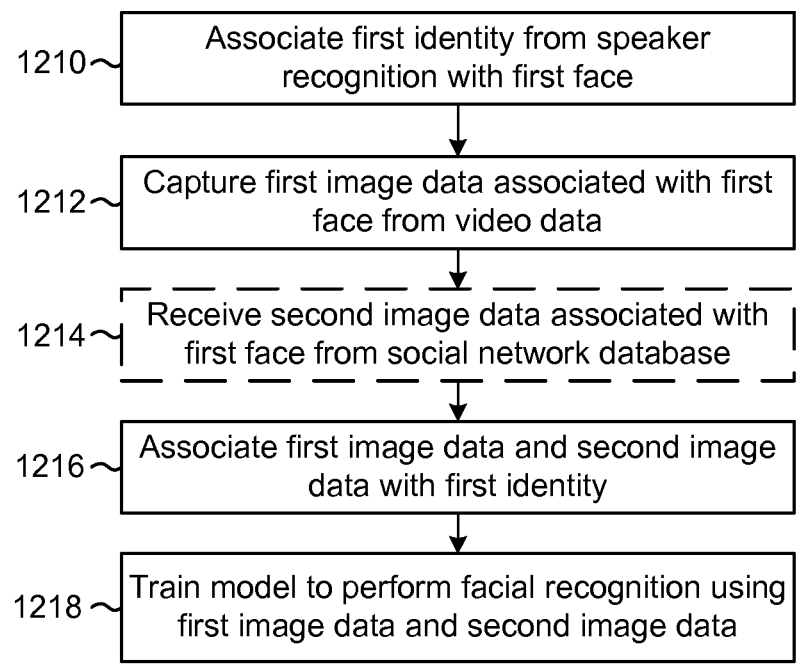
FIG. 12 is a flowchart conceptually illustrating an example method for training a model for facial recognition according to embodiments of the present disclosure.

FIG. 12 is a flowchart conceptually illustrating an example method for training a model for facial recognition according to embodiments of the present disclosure. As illustrated in FIG. 12, the device 102 may associate (1210) a first identity from speaker recognition with the first face, may capture (1212) first image data associated with the first face from the video data and may optionally receive (1214) second image data associated with the first face from a social network database. As a result, the device 102 may associate (1216) the first image data and the second image data with the first identity and train (1218) a model to perform facial recognition using the first image data and the second image data. The output of the speaker recognition module 112 may be used for run-time training of the facial recognition module 110 (e.g., update the facial recognition database during run-time processing) and/or for training the facial recognition module 110 at a later point in time (e.g., update the facial recognition database at some point in the future).

Figure 13:
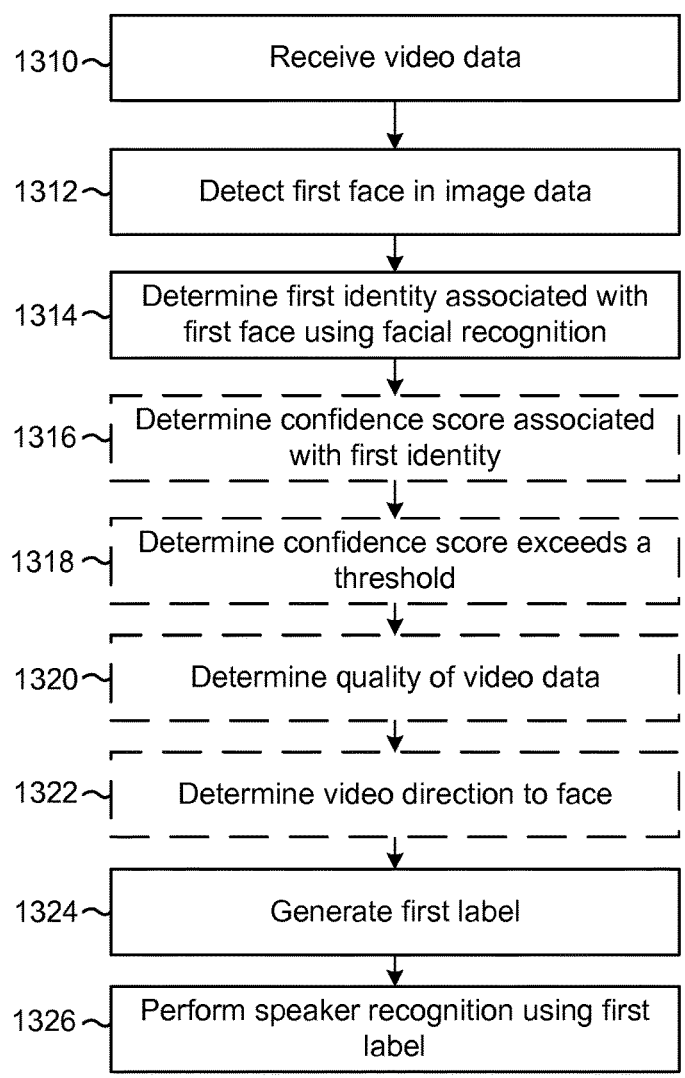
FIG. 13 is a flowchart conceptually illustrating an example method for generating an identification label according to embodiments of the present disclosure.

FIG. 13 is a flowchart conceptually illustrating an example method for generating an identification label according to embodiments of the present disclosure. As illustrated in FIG. 13, the device 102 may receive (1310) video data, detect (1312) a first face in image data associated with the video data, and determine (1314) a first identity associated with the first face using facial recognition. Optionally, the device 102 may determine (1316) a confidence score associated with the first identity, determine (1318) that the confidence score exceeds a threshold, determine (1320) a quality of video data and determine (1322) a video direction associated with the first face. The device 102 may generate (1324) a first label (e.g., first identification label 216-1) including the first identity, a timestamp or duration of time associated with the first label and optionally the confidence score, quality of video data and video direction. The device 102 may then perform (1326) speaker recognition using the first label.

FIGS. 14A-14D are flowcharts conceptually illustrating example methods for using facial recognition to assist speaker recognition according to embodiments of the present disclosure.

Figure 14A:
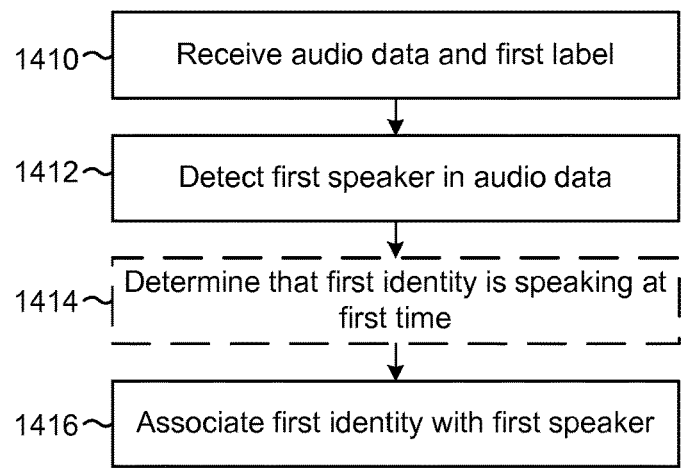
FIGS. 14A-14D are flowcharts conceptually illustrating example methods for using facial recognition to assist speaker recognition according to embodiments of the present disclosure.

FIG. 14A illustrates an example of a result of the facial recognition being used to identify a speaker without using speaker recognition. For example, a confidence score associated with the first identity determined in FIG. 13 may be high and the device 102 may therefore determine that the first identity is accurate. As illustrated in FIG. 14A, the device 102 may receive (1410) audio data and the first label generated in FIG. 13. The device 102 may then detect (1412) a first speaker in the audio data, may optionally determine (1414) that the first identity is speaking at the first time based on the first label, and may associate (1416) the first identity with the first face.

Figure 14B:
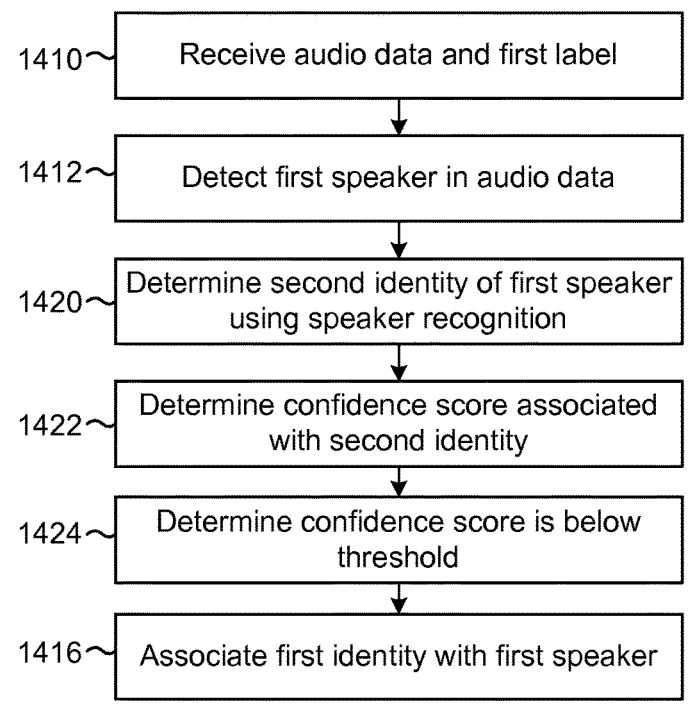

FIG. 14B illustrates an example of a result of the facial recognition being used to identify a speaker that was not accurately identified using speaker recognition. For example, the speaker recognition may result in a low confidence score and the device 102 may associate the first identity determined in FIG. 13 with the face. As illustrated in FIG. 14B, the device 102 may receive (1410) the audio data and the first label and may detect (1412) the first speaker in the audio data. The device 102 may determine (1420) a second identity of the first speaker using speaker recognition, may determine (1422) a confidence score associated with the second identity and determine (1424) that the confidence score is below a threshold. As a result, the device 102 may associate (1416) the first identity with the first speaker.

Figure 14C:
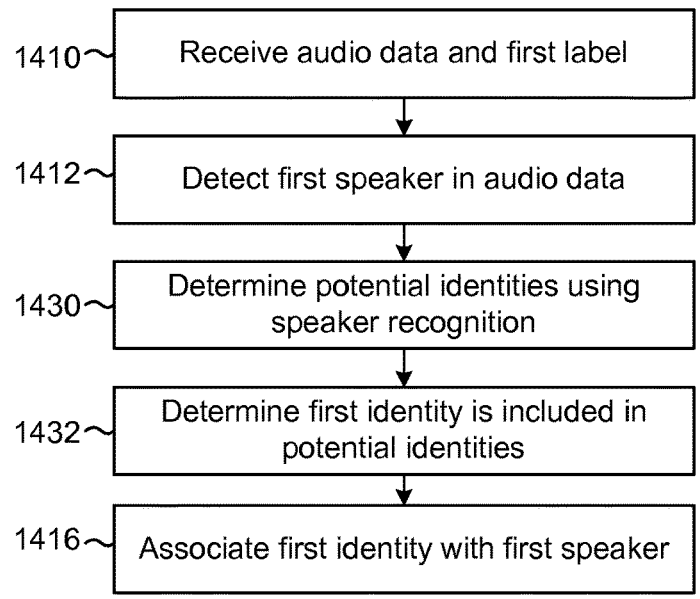

FIG. 14C illustrates an example of a result of the facial recognition being used to select an identity from a group. For example, the speaker recognition may associate a speaker with multiple identities and the device 102 may select the first identity determined in FIG. 13 from the multiple identities. As illustrated in FIG. 14C, the device 102 may receive (1410) the audio data and the first label and may detect (1412) the first speaker in the audio data. The device 102 may then determine (1430) potential identities using speaker recognition, determine (1432) that the first identity is included in the potential identities and associate (1416) the first identity with the first speaker.

Figure 14D:
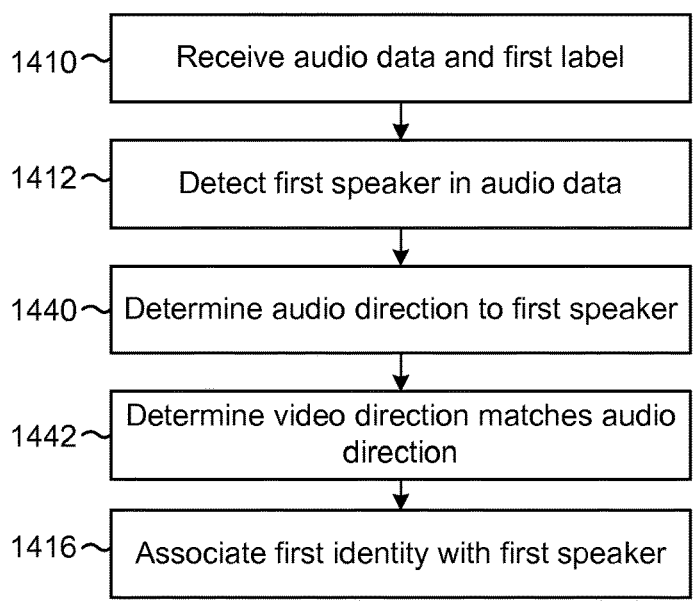

FIG. 14D illustrates an example of a result of the facial recognition being associated with a speaker based on the video direction matching an audio direction. For example, the facial recognition may include a video direction (e.g., direction from the device 102 to a face) in the first label and the speaker recognition may identify an audio direction associated with a speaker, determine that the audio direction is equal to the video direction and associate the first identity with the speaker. As illustrated in FIG. 14D, the device 102 may receive (1410) the audio data and the first label (including a video direction associated with the first identity) and may detect (1412) the first speaker in the audio data. The device 102 may then determine (1440) an audio direction to the first speaker, determine (1442) that the audio direction matches the video direction and associate (1416) the first identity with the first speaker.

Figure 15A:
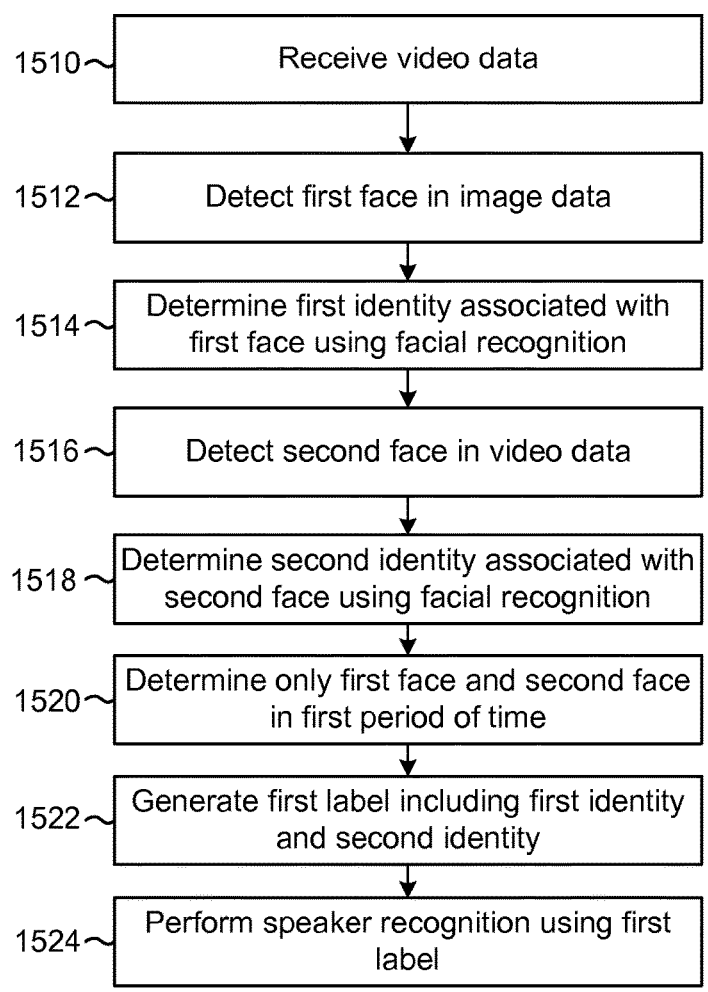
FIGS. 15A-15B are flowcharts conceptually illustrating example methods for using facial recognition to assist speaker recognition according to embodiments of the present disclosure.
Figure 15B:
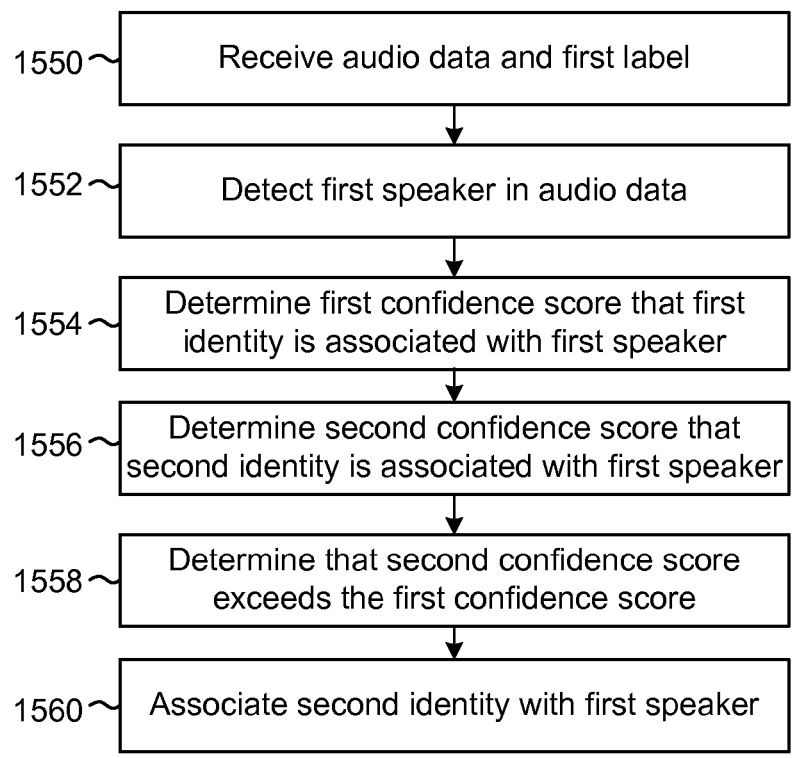

FIGS. 15A-15B are flowcharts conceptually illustrating example methods for using facial recognition to assist speaker recognition according to embodiments of the present disclosure. While FIG. 13 illustrated an example of the facial recognition generating a first label including a single identity, FIG. 15A illustrates an example of the facial recognition generating a first label including multiple identities. Therefore, instead of the device 102 associating the single identity with a first speaker (as discussed above with regard to FIGS. 14A-14D), FIG. 15B illustrates the device 102 using the multiple identities to narrow results from the speaker recognition.

As illustrated in FIG. 15A, the device 102 may receive (1510) video data, may detect (1512) a first face in image data associated with the video data and may determine (1514) a first identity associated with the first face using facial recognition. In addition, the device 102 may detect (1516) a second face in the image data, determine (1518) a second identity associated with the second face using the facial recognition, and determine (1520) that the video data only includes the first face and the second face in a first period of time. Therefore, the device 102 may generate (1522) a first label including the first identity and the second identity and perform (1524) speaker recognition using the first label.

As illustrated in FIG. 15B, the device 102 may receive (1550) audio data and the first label and may detect (1552) a first speaker in the audio data. The device 102 may then determine (1555) a first confidence score that the first identity is associated with the first speaker, determine (1556) a second confidence score that the second identity is associated with the first speaker and determine (1558) that the second confidence score exceeds the first confidence score. As a result, the device 102 may associate (1560) the second identity with the first speaker.

Figure 16:
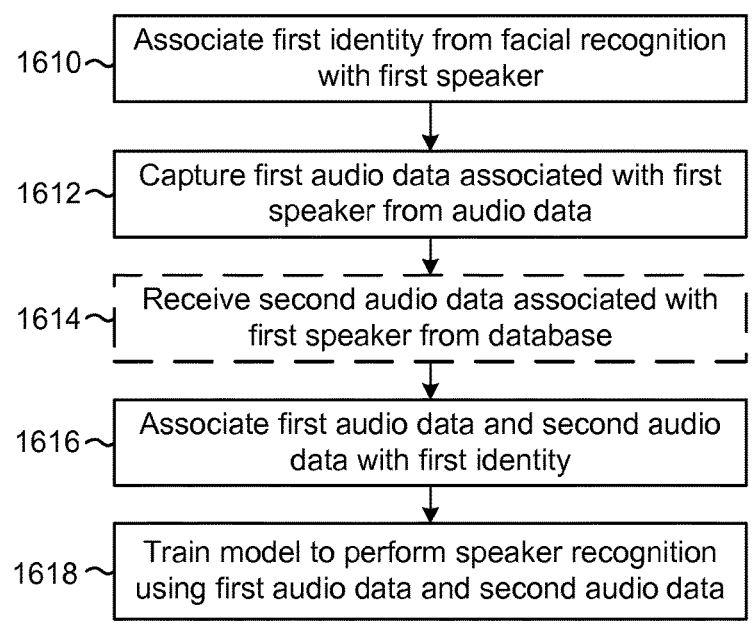
FIG. 16 is a flowchart conceptually illustrating an example method for training a model for speaker recognition according to embodiments of the present disclosure.
Figure 17A:
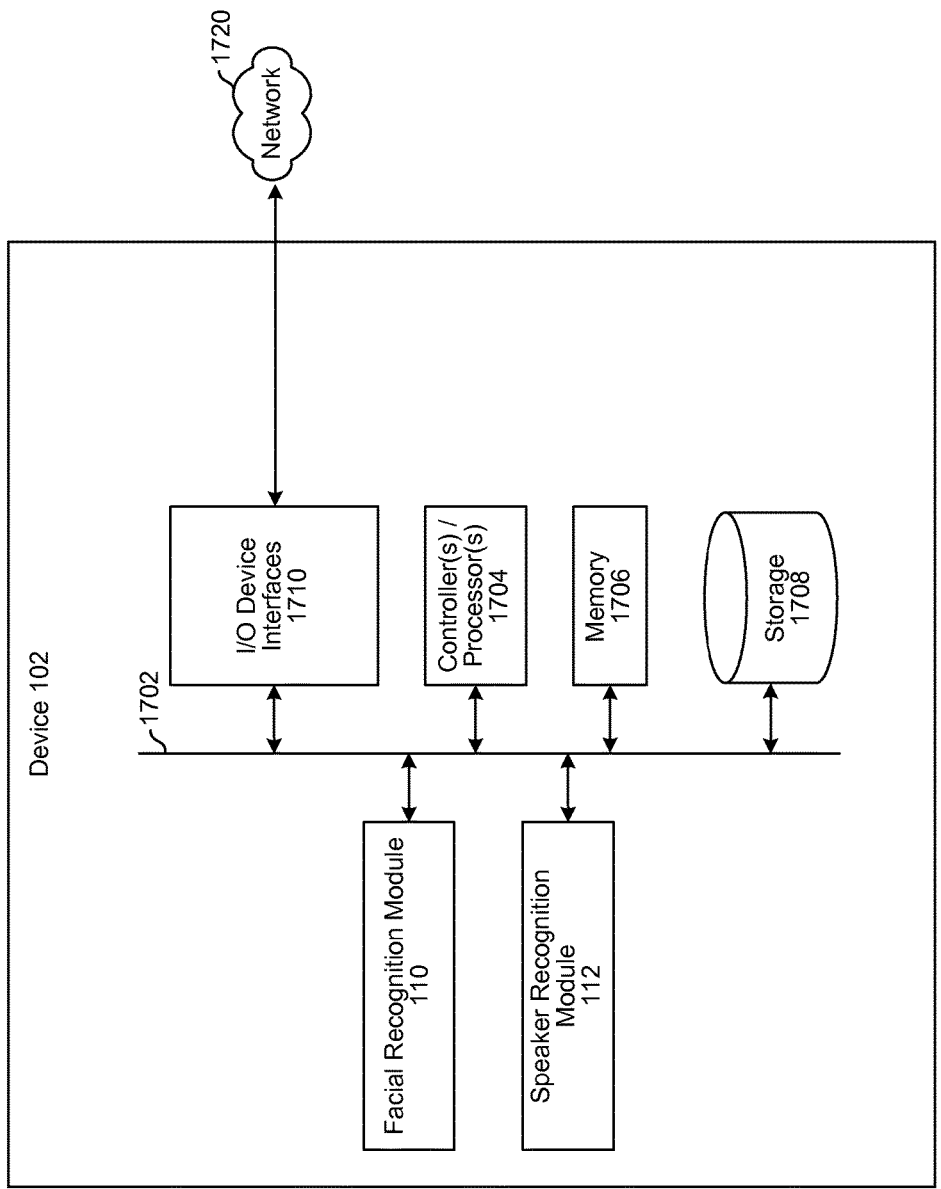
FIGS. 17A-17B are block diagrams conceptually illustrating example components of a system according to embodiments of the present disclosure.
Figure 17B:
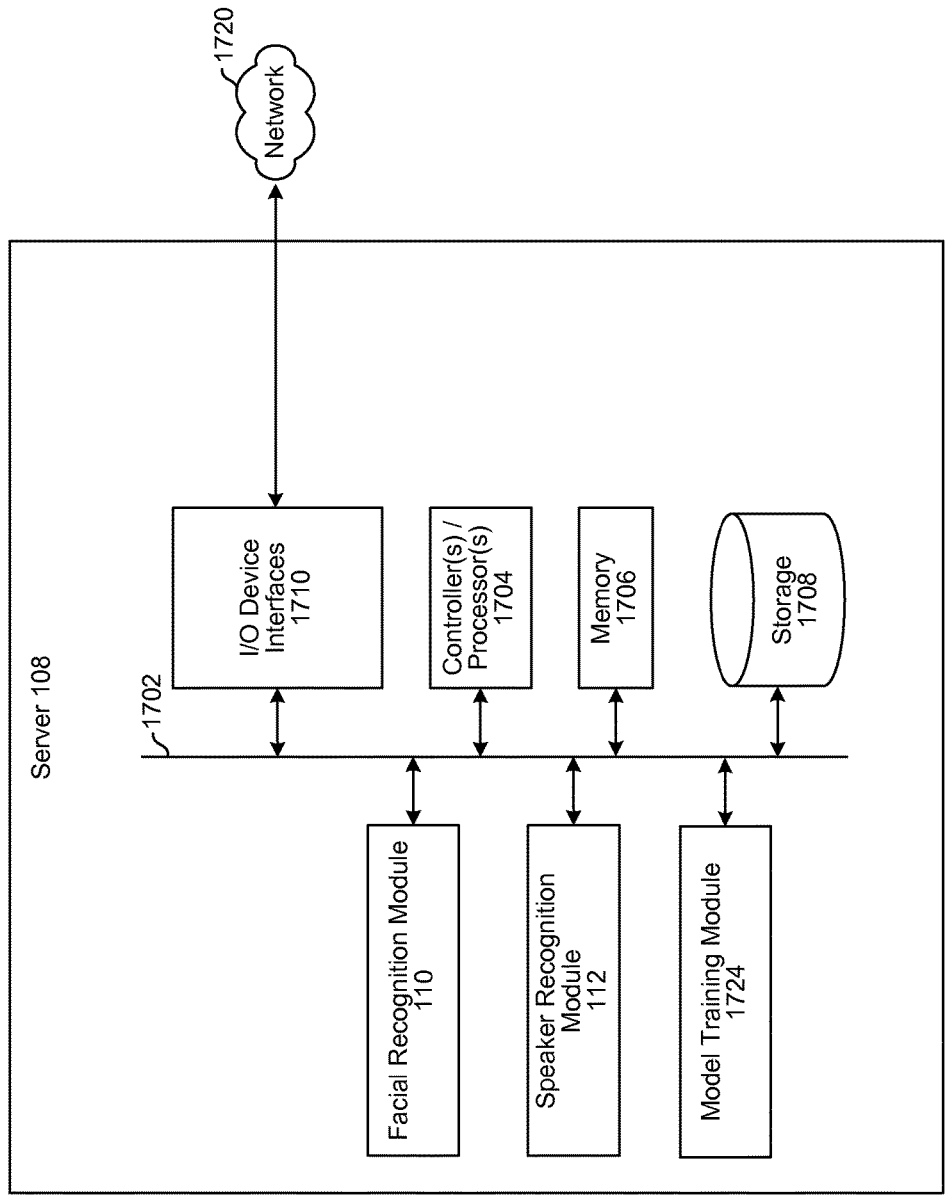

FIG. 16 is a flowchart conceptually illustrating an example method for training a model for speaker recognition according to embodiments of the present disclosure. As illustrated in FIG. 16, the device 102 may associate (1610)

a first identity from facial recognition with the first speaker, may capture (1212) first audio data associated with the first speaker from the audio data and may optionally receive (1214) second audio data associated with the first speaker from a social network database and/or audio recordings of voice calls. As a result, the device 102 may associate (1216) the first audio data and the second audio data with the first identity and train (1218) a model to perform speaker recognition using the first audio data and the second audio data. The output of the facial recognition module 110 may be used for run-time training of the speaker recognition module 112 (e.g., update the speaker recognition database during run-time processing) and/or for training the speaker recognition module 112 at a later point in time (e.g., update the speaker recognition database at some point in the future), FIGS. 17A-17B illustrate block diagrams conceptually illustrating example components of a system 100 including one or more of a device 102 and a server 108. Depending upon how the system is structured, some of the components illustrated in FIG. 17A as part of the device 102 or in FIG. 17B as part of the server 108 may be included only in the device 102 or in the server 108, or may be distributed across multiple devices 102 and/or servers 108. Other components not illustrated may also be included in the device 102 and/or the server 108. In operation, the system 100 may include computer-readable and computer-executable instructions that reside in storage 1708 on the device 102/server 108. The device 102/server 108 may be an electronic device capable of performing facial recognition and/or speaker recognition. Examples of electronic devices may include computers (e.g., a desktop, a laptop, a server or the like), portable devices (e.g., a camera (such as a 360° video camera), smart phone, tablet or the like), media devices (e.g., televisions, video game consoles or the like) or the like. The device 102/server 108 may also be a component of any of the abovementioned devices or systems.

As illustrated in FIGS. 17A-17B, the device 102/server 108 may include an address/data bus 1702 for conveying data among components of the device 102. Each component within the device 102/server 108 may also be directly connected to other components in addition to (or instead of) being connected to other components across the bus 1702.

The device 102/server 108 may include one or more controllers/processors 1704 comprising one-or-more central processing units (CPUs) for processing data and computer-readable instructions and a memory 1706 for storing data and instructions. The memory 1706 may include volatile random access memory (RAM), non-volatile read only memory (ROM), non-volatile magnetoresistive (MRAM) and/or other types of memory. The device 102/server 108 may also include a data storage component 1708 for storing data and processor-executable instructions. The data storage component 1708 may include one or more non-volatile storage types such as magnetic storage, optical storage, solid-state storage, etc. The device 102/server 108 may also be connected to a removable or external non-volatile memory and/or storage (such as a removable memory card, memory key drive, networked storage, etc.) through the input/output device interfaces 1710.

The device 102/server 108 includes input/output device interfaces 1710. A variety of components may be connected to the device 102/server 108 through the input/output device interfaces 1710, such as camera(s) 104 and microphone(s) 106. However, the disclosure is not limited thereto and the device 102/server 108 may not include an integrated camera or microphone. Thus, the camera(s) 104, microphone(s) 106 and/or other components may be integrated into the device 102 or may be separate without departing from the disclosure.

The input/output device interfaces 1710 may be configured to operate with a network 1720, for example a wireless local area network (WLAN) (such as WiFi), Bluetooth, zigbee and/or wireless networks, such as a Long Term Evolution (LTE) network, WiMAX network, 3G network, etc. The network 1720 may include a local or private network or may include a wide network such as the internet. Devices may be connected to the network 1720 through either wired or wireless connections.

The input/output device interfaces 1710 may also include an interface for an external peripheral device connection such as universal serial bus (USB), FireWire, Thunderbolt, Ethernet port or other connection protocol that may connect to networks 1720. The input/output device interfaces 1710 may also include a connection to an antenna (not shown) to connect one or more networks 1720 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 102/server 108 further includes a facial recognition module 2110, a speaker recognition module 2112 and/or a model training module 1724, which may comprise processor-executable instructions stored in storage 1708 to be executed by controller(s)/processor(s) 1704 (e.g., software, firmware), hardware, or some combination thereof. For example, components of the facial recognition module 2110, the speaker recognition module 2112 and/or the model training module 1724 may be part of a software application running in the foreground and/or background on the device 102/server 108. The facial recognition module 2110, the speaker recognition module 2112 and/or the model training module 1724 may control the device 102/server 108 as discussed above, for example with regard to FIGS. 1, 9, 10A-10D, 11A-11B, 12, 13, 14A-14D, 3A-3B and/or 4. Some or all of the controllers/modules of the facial recognition module 2110, the speaker recognition module 2112 and/or the model training module 1724 may be executable instructions that may be embedded in hardware or firmware in addition to, or instead of, software. In one embodiment, the device 102/server 108 may operate using an Android® operating system (such as Android® 4.3 Jelly Bean, Android® 4.4 KitKat or the like).

Executable computer instructions for operating the device 102/server 108 and its various components may be executed by the controller(s)/processor(s) 1704, using the memory 1706 as temporary "working" storage at runtime. The executable instructions may be stored in a non-transitory manner in non-volatile memory 1706, storage 1708, or an external device. Alternatively, some or all of the executable instructions may be embedded in hardware or firmware in addition to or instead of software.

The components of the device(s) 102/server 108, as illustrated in FIGS. 17A-17B, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

Figure 18:
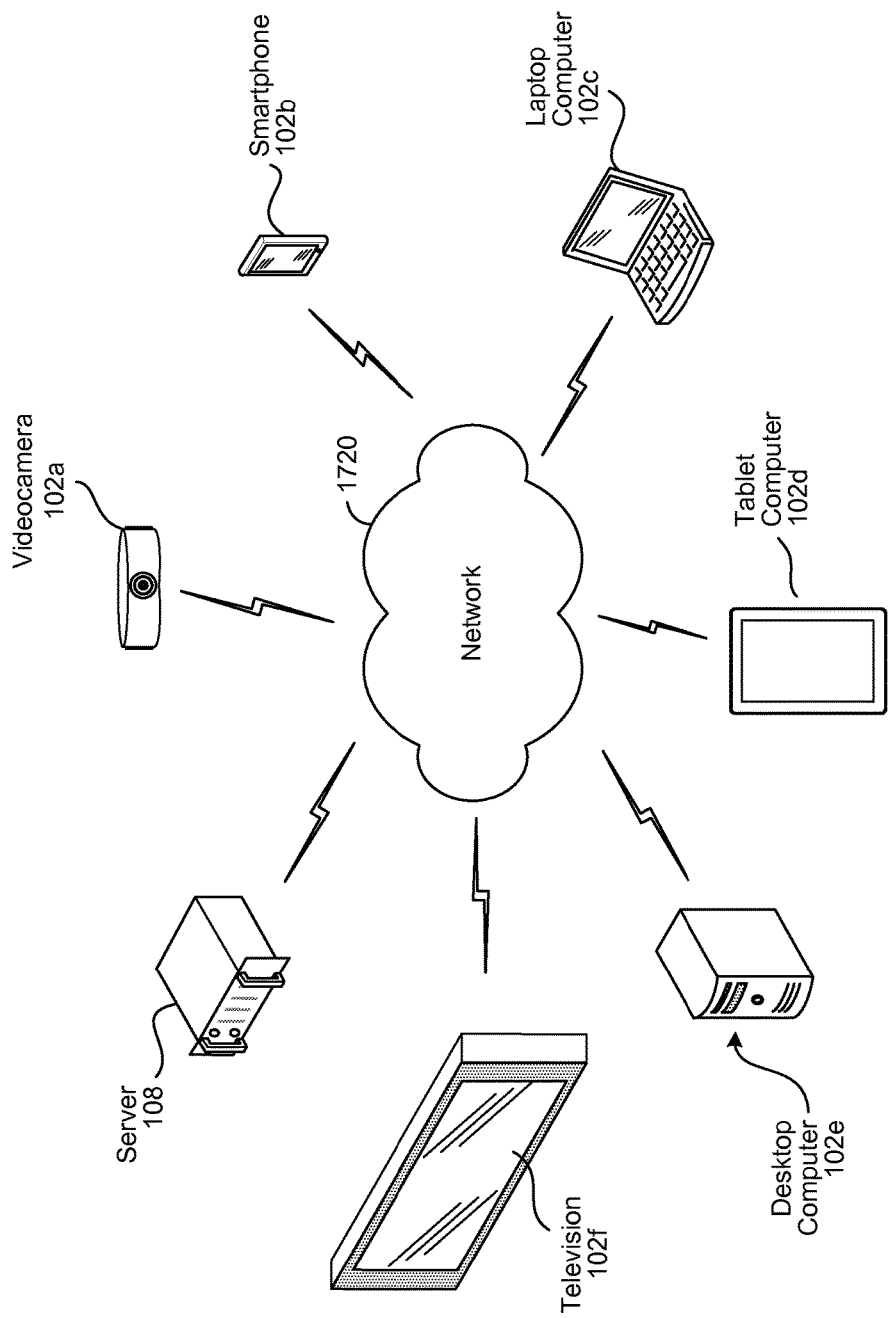
FIG. 18 illustrates an example of a computer network for use with the system.

As shown in FIG. 18, multiple devices may be connected over a network 1720. The network 1720 may include a local or private network or may include a wide network such as the internet. Devices may be connected to the network 1720 through either wired or wireless connections. For example, a smart phone 102b may be connected to the network 1720 through a wireless service provider. Other devices, such as a video camera 102a, laptop computer 102c, tablet computer 102d, desktop computer 102e, television 102f, and/or server 108, may connect to the network 1720 through a wired connection. The server 108 may be configured to receive, store, process and/or stream data related to image data and/or audio data associated with one or more of the video camera 102a, smartphone 102b, laptop computer 102c, tablet computer 102d, desktop computer 102e and television 102f, etc. For example, the server 108 may perform any of the steps described above with regard to FIGS. 1, 9, 10A-10D, 11A-11B, 12, 13, 14A-14D, 3A-3B and/or 4. Alternatively, the server 108 may receive and store data generated by the video camera 102a, smartphone 102b, laptop computer 102c, tablet computer 102d, desktop computer 102e, television 102f, etc. using any of the steps described above. Thus, the sever 108 may process and output audio data, image data and/or video data to allow convenient access to any of the devices connected to the server 108.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method of recognizing an individual using an electronic device, the method comprising:
   recording, during a first period of time, first video data using a device;
   recording, during the first period of time, first audio data using the device;
   detecting first speech associated with a first speaker within the first audio data;
   determining a first identity of the first speaker using speaker recognition;
   determining a first confidence score associated with the first identity;
   determining that the first confidence score exceeds a threshold;
   generating a first label including the first identity, the first confidence score, and a first period of time associated with the first speech within the first audio data;
   determining, using the first video data, that a first face associated with the first speaker is unidentifiable;
   recording, during a second period of time later than the first period of time, second video data using the device;
   recording, during the second period of time, second audio data using the device;
   detecting a second face represented in the second video data;
   detecting second speech associated with the first speaker within the first audio data;
   determining the first speech corresponds to the second speech; and associating, based at least in part on determining the first speech corresponds to the second speech, the first identity with the second face.

2. The computer-implemented method of claim 1, further comprising:
receiving, prior to receiving the first video data, previous video data;
detecting a third face in the previous video data;
determining that the third face is not recognized in a facial recognition database;
assigning a unique identification to the third face;
determining that the second face is associated with the unique identification;
associating the first identity with the unique identification;
associating the previous video data with the first identity; and
training, using the previous video data and the second video data, a model to perform facial recognition, wherein the training improves facial recognition associated with the first identity.

3. The computer-implemented method of claim 1, further comprising:
detecting a third face in the first video data;
determining a second identity of the third face using facial recognition;
determining a second confidence score associated with the second identity;
determining that the second confidence score exceeds a second threshold;
determining that the third face is speaking during the second period of time;
generating a second label including the second identity, the second confidence score and the second period of time;
detecting second speech in the first audio data, the second speech corresponding to the second period of time; and
associating the second identity with a voice of the second speech.

4. The computer-implemented method of claim 1, further comprising:
detecting a third face in the second video data;
determining a second identity of the third face using facial recognition;
determining that the second video data includes only the third face and the second face, wherein the second video data includes the 360 degree field of view surrounding the device;
generating a second label including the first identity, the second identity and the second period of time;
detecting second speech within the first audio data during the second period of time; and
performing speaker recognition on the second speech using the second label, wherein the speaker recognition selects an identity to associate with the second speech from between the first identity and the second identity included in the second label.

5. A computer-implemented method, the method comprising:
receiving, from an image-capture device, first image data captured during a first time period;
receiving, from an audio-capture device, first audio data captured during the first time period;
detecting first speech within the first audio data;
assigning a first identity to a source of the first speech;
performing facial recognition using the first image data;
determining, using the first image data, that a first face associated with the source of the first speech is unidentifiable;
receiving, from the image-capture device, second image data captured during a second time period later than the first time period;
receiving, from the audio-capture device, second audio data captured during the second time period;
detecting a second face represented in the second image data;
detecting second speech within the second audio data;
determining that the second speech is associated with the first identity; and
associating, based at least in part on determining that the second face is associated with a source of the second speech and that the second speech is associated with the first identity, the second face with the first identity.

6. The computer-implemented method of claim 5, wherein associating the first face with the first identity further comprises:
determining, using the first audio data, a first location, relative to the audio-capture device, associated with the source of the first speech;
determining, using the second image data, a second location, relative to the image-capture device, of the second face; and
determining that the second location substantially matches the first location.

7. The computer-implemented method of claim 5, further comprising:
capturing additional image data associated with the second face;
associating the additional image data with the first identity; and
training, using the additional image data, a model to perform facial recognition, wherein the training improves facial recognition associated with the first identity.

8. The computer-implemented method of claim 5, further comprising:
determining a first confidence score associated with the first identity;
determining that the first confidence score exceeds a threshold; and
generating a first label including the first identity, the first confidence score and first time data associated with the first speech within the first audio data,
wherein the performing facial recognition further comprises:
performing facial recognition using the first identity, the first confidence score and the first time data.

9. The computer-implemented method of claim 5, further comprising:
detecting third speech in the first audio data;
determining a second identity corresponding to the third speech;
determining that the first audio data includes only the first speech and the third speech during the first time period;
generating a first label including the first identity, and first time data corresponding to the first time period; and
generating a second label including the first identity, the second identity and the first time data,
wherein the performing facial recognition further comprises:

performing facial recognition using the first image data and the second image data, wherein the facial recognition selects an identity from the first identity and the second identity.

10. The computer-implemented method of claim 9, wherein the performing facial recognition using the first image data and the second image data further comprises:
determining that the second face is speaking during the second time period;
determining a first confidence score that the first identity is associated with the second face;
determining a second confidence score that the second identity is associated with the second face;
determining that the second confidence score exceeds the first confidence score; and
associating the second identity with the second face.

11. The computer-implemented method of claim 5, further comprising:
receiving, prior to receiving the first image data, previous image data;
detecting the second face in the previous image data;
determining that the second face is not recognized in a facial recognition database;
assigning a unique identification to the second face;
associating the first identity with the second face;
associating the first identity with the unique identification;
associating the previous image data with the first identity; and
training, using the previous image data and the first image data, a model to perform facial recognition, wherein the training improves facial recognition associated with the first identity.

12. The computer-implemented method of claim 5, further comprising:
determining a quality of the first audio data; and
generating a first label including the first identity, a first time associated with the first speech within the first audio data, and the quality of the first audio data, and
wherein the performing facial recognition further comprises:
determining that the quality of the first audio data exceeds a threshold.

13. A computer-implemented method, the method comprising:
receiving, from an audio-capture device, first audio data captured during a first time period;
receiving, from an image-capture device, first image data captured during the first time period;
detecting a first face in the first image data;
assigning a first identity to the first face;
performing speaker recognition using the first audio data;
determining, using the first audio data, that first speech associated with a first source is unidentifiable;
receiving, from the audio-capture device, second audio data captured during a second time period later than the first time period;
receiving, from the image-capture device, second image data captured during the second time period;
identifying a second source of second speech using the second audio data;
detecting a second face within the second image data;
determining that the second face is associated with a source of the second speech;
determining that the second face is associated with the first identity; and
associating, based at least in part on determining that the second face is associated with a source of the second speech and that the second face is associated with the first identity, the second speech with the first identity.

14. The computer-implemented method of claim 13, wherein associating the first speech with the first identity further comprises:
determining, using the first image data, a first location, relative to the image-capture device, associated with the first face;
determining, using the second audio data, a second location, relative to the audio-capture device, of the second speech; and
determining that the second location substantially matches the first location.

15. The computer-implemented method of claim 13, further comprising:
capturing additional audio data associated with the second speech;
associating the additional audio data with the first identity; and
training, using the additional audio data, a model to perform speaker recognition, wherein the training improves speaker recognition associated with the first identity.

16. The computer-implemented method of claim 13, further comprising:
determining a first confidence score associated with the first identity; and
determining that the first confidence score exceeds a threshold; and
generating a first label including the first identity, the first confidence score and a first time associated with the first image data,
wherein the performing speaker recognition further comprises:
performing facial recognition using the first identity, the first confidence score and the first time.

17. The computer-implemented method of claim 13, further comprising:
detecting a third face in the first image data;
determining a second identity of the third face;
determining that the first image data includes only the first face and the third face during the first time period;
generating a first label including the first identity, the first location, and the first time period; and
generating a second label including the first identity, the second identity and the first time period,
wherein the performing speaker recognition further comprises:
performing speaker recognition using the first audio data and the second audio data, wherein the speaker recognition selects an identity from the first identity and the second identity.

18. The computer-implemented method of claim 17, wherein the performing speaker recognition using the first audio data and the second audio data further comprises:
determining a first confidence score that the first identity is associated with the first speech;
determining a second confidence score that the second identity is associated with the first speech;
determining that the second confidence score exceeds the first confidence score; and
associating the second identity with the first speech.

19. The computer-implemented method of claim 13, further comprising:
receiving, prior to receiving the first audio data, previous audio data;
detecting the first speech in the previous audio data;

determining that a confidence score associating the first speech with an identity using a speaker recognition database is below a threshold;

assigning a unique identification to the first source;

associating the first identity with the first speech;

associating the first identity with the unique identification;

associating the first speech and the second speech with the first identity; and training, using the first speech and the second speech, a model to perform speaker recognition, wherein the training improves speaker recognition associated with the first identity.

20. The computer-implemented method of claim 13, further comprising:

determining a quality of the first image data; and generating a first label including the first identity, a first time associated with the first image data, and the quality of the first image data, and wherein the performing speaker recognition further comprises:

determining that the quality of the first image data exceeds a threshold.

\* \* \* \* \*